(12) United States Patent
Ozaki et al.

(10) Patent No.: US 6,175,439 B1
(45) Date of Patent: Jan. 16, 2001

(54) ROTARY BODY FOR A POLYGONAL MIRROR TYPE SCANNER AND METHOD OF MACHINING THE SAME

(75) Inventors: Shinichi Ozaki; Hideki Konno; Fumikata Andoh, all of Kanagawa (JP)

(73) Assignee: Ricoh Company, Inc., Tokyo (JP)

( * ) Notice: Under 35 U.S.C. 154(b), the term of this patent shall be extended for 0 days.

(21) Appl. No.: 09/330,058

(22) Filed: Jun. 11, 1999

(30) Foreign Application Priority Data

Jun. 12, 1998 (JP) .................................................. 10-165519
Jun. 12, 1998 (JP) .................................................. 10-165520
Apr. 9, 1999 (JP) .................................................. 11-102848
May 20, 1999 (JP) .................................................. 11-139522

(51) Int. Cl.[7] .................................................. G02B 26/08
(52) U.S. Cl. .......................... 359/198; 359/196; 359/200; 359/216
(58) Field of Search .................... 359/196, 197, 359/198, 199, 200, 216, 217, 218, 219

(56) References Cited

U.S. PATENT DOCUMENTS 5,598,291 * 1/1997 Isobe et al. .......................... 359/198
5,666,219 * 9/1997 Ishizuki et al. ...................... 359/198

FOREIGN PATENT DOCUMENTS

| 62-164017 | 7/1987 | (JP) . | |
|---|---|---|---|
| 4-289813 | * 10/1992 | (JP) | .................................... 359/200 |
| 5-241090 | 9/1993 | (JP) . | |
| 5-257078 | 10/1993 | (JP) . | |
| 6-098517 | 4/1994 | (JP) . | |
| 7-287183 | 10/1995 | (JP) . | |
| 8-062527 | 3/1996 | (JP) . | |
| 9-230269 | 9/1997 | (JP) . | |

* cited by examiner

Primary Examiner—Darren Schuberg
(74) Attorney, Agent, or Firm—Oblon, Spivak, McClelland, Maier & Neustadt, P.C.

(57) ABSTRACT

A rotary body for use in a polygonal mirror type scanner includes an element for causing the rotary body to rotate. The element is mounted to a mounting portion by press fitting while a stress ascribable to press fitting is prevented from being transferred to the side of the rotary body. The mounting portion is formed integrally with one of opposite major surfaces of the rotary body perpendicular to the side. The rotary body includes a minimum number of parts, does not need highly accurate adhesion, has high durability, and is easy to produce and free from deformation apt to occur on its side.

18 Claims, 23 Drawing Sheets

ROTARY BODY FOR A POLYGONAL MIRROR TYPE SCANNER AND METHOD OF MACHINING THE SAME

BACKGROUND OF THE INVENTION

The present invention relates to a polygonal mirror type scanner included in an electrophotographic copier, laser printer, facsimile apparatus or similar image forming apparatus. More particularly, the present invention relates to a rotary body included in a polygonal mirror type scanner and a method of machining the same.

A polygonal mirror type scanner for the above application includes a scanner motor made up of a rotor portion and a stator portion. The rotor portion includes a flange on which a polygonal mirror is mounted. The scanner motor causes the polygonal mirror to rotate while reflecting light incident thereto and representative of image data. A magnet is mounted on the bottom or the inner circumference of a rotor yoke also included in the rotor portion.

To produce the above scanner motor, a rotary shaft is inserted in the flange while a rotor is affixed to the flange, in parallel with the machining of a flat polygonal mirror. The machined polygonal mirror is mounted to the subassembly of the flange, rotary shaft and rotor. Thereafter, the axis of rotation of the polygonal mirror is aligned with the axis of the rotary shaft and then fixed in place.

However, the problem with the above conventional scanner is that it is bulky because the polygonal mirror and scanner motor are physically separate from each other and because the scanner motor cannot be sufficiently reduced in size. The scanner therefore occupies a substantial space when mounted to a laser printer or similar image forming apparatus, obstructing the miniaturization of the apparatus.

In light of the above, Japanese Patent Laid-Open Publication No. 8-62527, for example, discloses a scanner motor constructed to miniaturize a polygonal mirror type scanner. The scanner motor taught in this document includes a hexagonal rotor yoke and chip mirrors separate from the rotor yoke. The chip mirrors are adhered to the hexagonal circumferential surfaces of the rotor yoke.

The chip mirrors, however, not only increase the number of parts of the scanner, but also need highly accurate adhesion to the rotor yoke. In addition, the chip mirrors are apt to come off or deform after adhesion due to a centrifugal force. Further, because a permanent magnet is mounted on the flat bottom of the rotor yoke, should the permanent magnet be inaccurately positioned relative to the rotor yoke, the magnet and shaft would become offset. This would disturb the dynamic balance and would thereby degrade the jitter characteristic and bring about oscillation and noise. Moreover, the rotor yoke is apt to come off or deform due to a centrifugal force. In addition, the positional adjustment of the polygonal mirror relative to the shaft needs highly accurate measuring means and affixing means.

Japanese Patent Laid-Open Publication No. 5-241090 proposes a polygonal mirror including a ceramic ring, a yoke and a rotor magnet constructed integrally with each other by casting aluminum. After the surfaces of the ceramic ring, yoke and rotor magnet have been machined, mirror surfaces are formed by deposition. However, a magnet positioned below the mirror surfaces is apt to reduce the accuracy of the mirror surfaces due to a centrifugal force acting on the magnet during high-speed rotation.

Technologies relating to the present invention are also disclosed in, e.g., Japanese Patent Laid-Open Publication Nos. 5-257078, 7-287183, 62-164017, 9-230269, and 6-98517.

SUMMARY OF THE INVENTION

It is therefore an object of the present invention to provide a rotary body for a polygonal mirror type scanner needing a minimum number of parts, obviating the need for highly accurate adhesion, durable, easy to produce, and free from distortion apt to occur on its side.

In accordance with the present invention, a rotary body formed with a plurality of surfaces on its side includes an element for causing the rotary body to rotate, and a mounting portion for mounting the element to the rotary body by press fitting while preventing a stress ascribable to press fitting from being transferred to the side. The mounting portion is formed integrally with one of opposite major surfaces of the rotary body perpendicular to the side.

Also, in accordance with the present invention, a rotary polygonal mirror includes a mirror forming portion including a side formed with a plurality of mirror surfaces at equally spaced locations in the circumferential direction, a first major surface perpendicular to the side, and a second major surface also perpendicular to the side and facing the first major surface at the opposite side of the above side. An annular thin portion is formed integrally with the first major surface. The annular thin portion has a substantially cylindrical configuration coaxial with the rotary shaft of the polygonal mirror and an outer circumference positioned closer to the rotary shaft than the side. The annular thin portion is displaced by a force ascribable to the press fitting of a magnet at a boarder between the first major surface and the annular thin portion.

Further, in accordance with the present invention, rotary unit includes a rotary polygonal mirror including a mirror forming portion having a side formed with a plurality of mirror surfaces at equally spaced locations in the circumferential direction, a first major surface perpendicular to the side, and a second major surface also perpendicular to the side and facing the first major surface at the opposite side of the side. A magnet is mounted on the polygonal mirror. A body faces the magnet and includes a yoke. A rotary shaft is affixed to either one of the body and polygonal mirror. The magnet and yoke cooperate to cause the polygonal mirror to rotate about the rotary shaft. An annular thin portion is formed integrally with the first major surface. The annular thin portion includes a substantially cylindrical inner circumference coaxial with the rotary shaft and an outer circumference positioned closer to the rotary shaft than the side. The annular thin portion is displaced by a force ascribable to the press fitting of a magnet at a boarder between the first major surface and the annular thin portion.

Moreover, in accordance with the present invention, a method of machining a rotary body including a side formed with a plurality of surfaces begins with the step of press fitting an element for causing the rotary body to rotate and having a cylindrical inner circumference in a mounting portion formed integrally with a major surface of the rotary body perpendicular to the side. A rotary shaft for causing the rotary body to rotate is mounted to the center of the rotary body. A plurality of rotary bodies each including the element and rotary shaft are stacked one upon the other. Collars are positioned between nearby rotary bodies, and each is caused to engage with the outer circumference of the respective mounting portion. In this condition, the rotary bodies have their sides machined at the same time.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
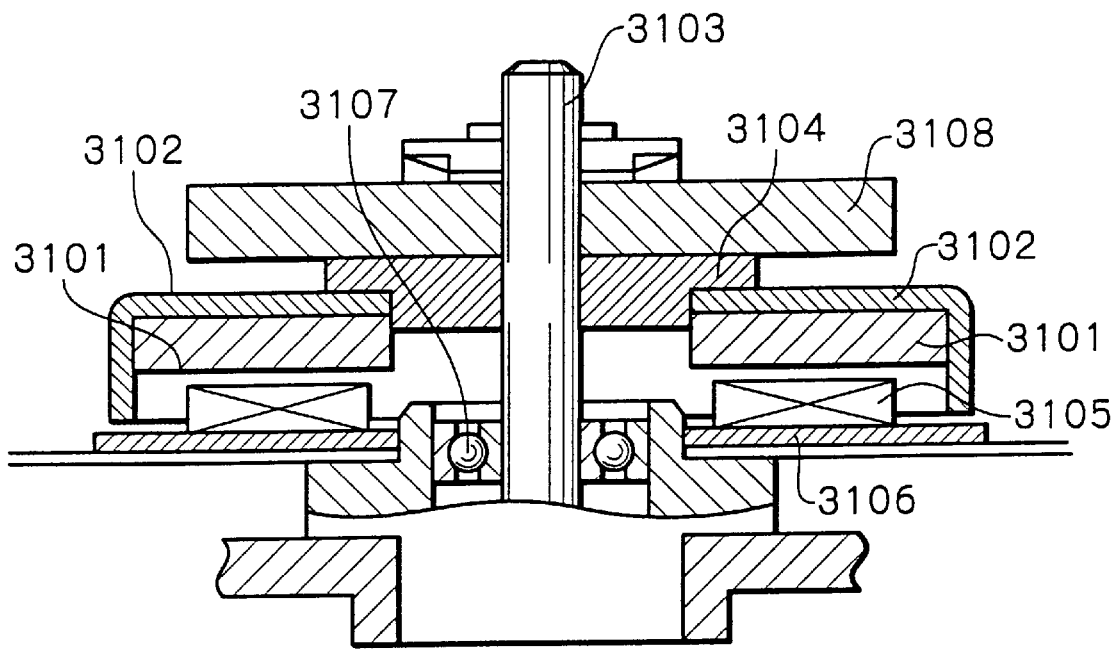
FIG. 1 is a sectional view showing a conventional polygonal mirror type scanner.

To better understand the present invention, brief reference will be made to a conventional polygonal mirror type scanner, shown in FIG. 1. As shown, the scanner includes a scanner motor generally made up of a rotor portion and a stator portion. The rotor portion includes a rotor yoke 3102 with a magnet 3101 mounted on the underside thereof, a rotary shaft 3103, and a flange 3104 via which the rotor yoke 3102 is affixed to the shaft 3103. The stator portion is made up of a stator yoke 3106 with a coil 3105 mounted on its top and a bearing 3107 rotatably supporting the shaft 3103. A polygonal mirror 3108 is affixed to the flange 3104.

The problem with the above conventional scanner is that it is bulky because the polygonal mirror 3108 and scanner motor are physically separate from each other and because the scanner motor cannot be sufficiently reduced in size.

Figure 2:
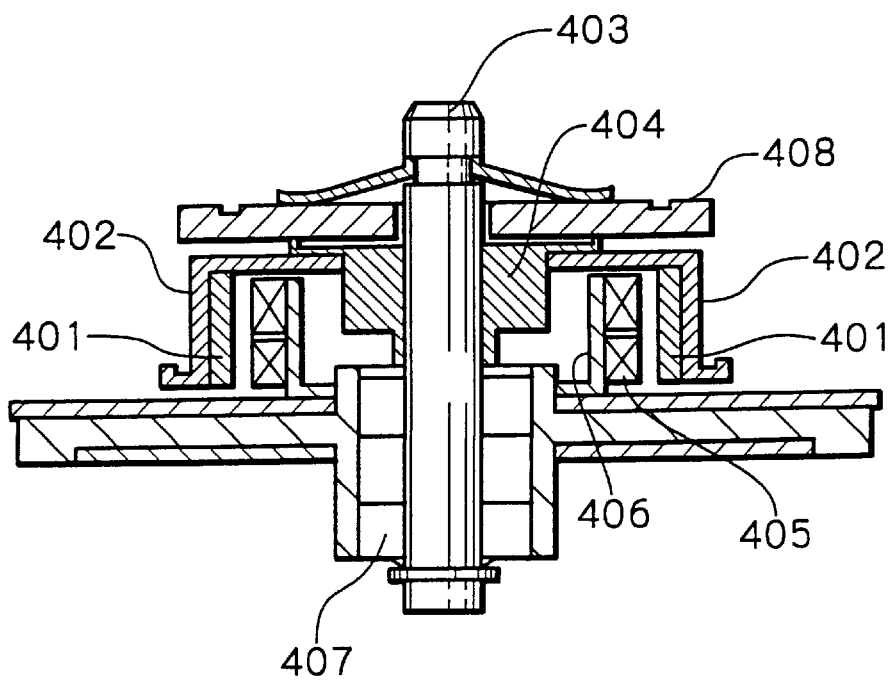
FIG. 2 is a sectional view showing another conventional polygonal mirror type scanner.

FIG. 2 shows another conventional polygonal mirror type scanner. As shown, the scanner is also made up of a rotor portion and a stator portion. The rotor portion includes a rotor yoke 402 with a magnet 401 fitted on its inner circumference, a rotary shaft 403, and a flange 404 via which the rotor yoke 402 is affixed to the rotary shaft 403. A polygonal mirror 408 is mounted on the flange 404. The stator portion includes a stator yoke 406 with a coil 405 mounted on its outer circumference and a bearing 407 rotatably supporting the rotary shaft 403. This scanner, however, has the same problems left unsolved as the scanner described with reference to FIG. 1.

Figure 3:
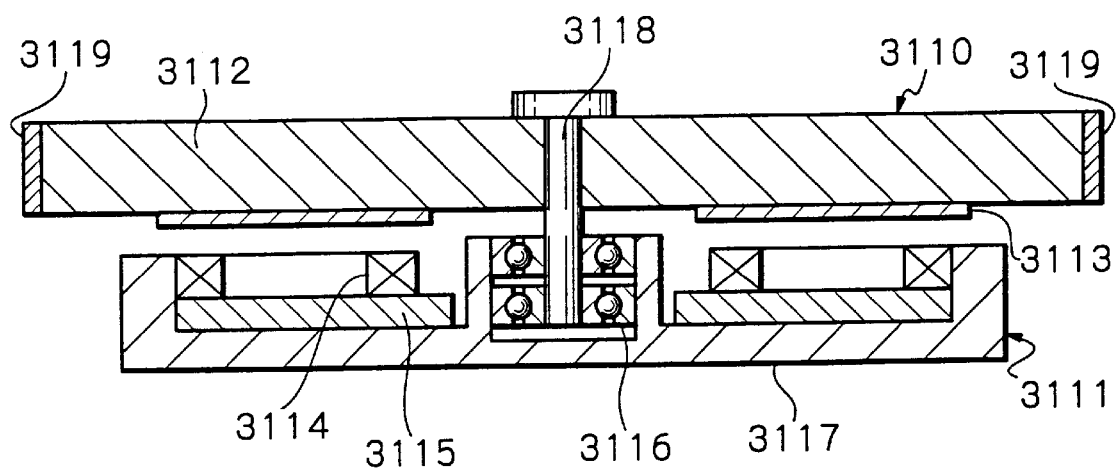
FIG. 3 is a sectional view showing a conventional scanner motor for use in a polygonal mirror type scanner.

FIG. 3 shows a conventional miniature scanner motor for driving a polygonal mirror and taught in Japanese Patent Laid-Open Publication No. 8-62527 mentioned earlier. As shown, the scanner motor includes a rotor 3110 and a stator 3111. The rotor 3110 is made up of a flat rotor yoke 3112 having a hexagonal contour and a permanent magnet 3113 mounted on the bottom of the rotor yoke 3112. The stator 3111 is made up of a flat armature coil 3114, a stator yoke 3115, a bearing 3116, and a housing 3117 accommodating them. The armature coil 3114 is spaced from the permanent magnet 3114 by an axial gap. The bearing 3116 rotatably supports a rotor shaft 3118.

The rotor yoke 3112 plays the role of the base of a polygonal mirror at the same time. Specifically, chip mirrors 3119 each are adhered to one of the hexagonal sides of the rotor yoke 3112, forming a polygonal mirror. Each chip mirror 3119 is implemented by aluminum foil with a mirror surface or a mirror formed of glass.

When a DC voltage is applied to the armature coil 3114 via a sensor less three-phase bipolar driver, not shown, the rotor yoke 3112 of the rotor 3110 spins about the rotor shaft 3118. While the motor is in rotation, a light beam is issued sideways toward the chip mirrors 3119 separate from the rotor yoke 3112. As a result, the rotor yoke 3112 serves as a polygonal mirror.

The chip mirrors 3119, however, not only increase the number of parts of the scanner, but also need highly accurate adhesion to the rotor yoke 3112. In addition, the chip mirrors 3119 are apt to come off or deform after adhesion due to a centrifugal force.

The permanent magnet 3113 is mounted on the flat bottom of the rotor yoke 3112. Therefore, should the permanent magnet 3113 be inaccurately positioned relative to the rotor yoke 3112, the magnet 3112 and shaft 3118 would become offset. This would disturb the dynamic balance and would thereby degrade the jitter characteristic and bring about oscillation and noise. Moreover, the rotor yoke 3112 is apt to come off or deform due to a centrifugal force.

Figure 4:
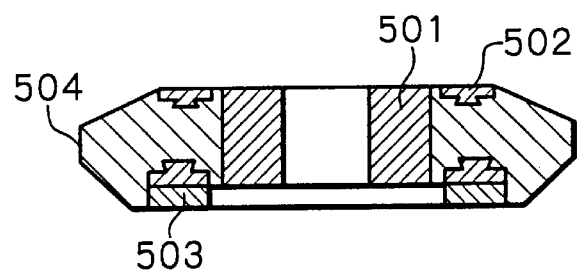
FIG. 4 is a sectional view showing a specific configuration of a rotor included in a conventional scanner motor.

FIG. 4 shows a polygonal mirror disclosed in Japanese Patent Laid-open publication No. 5-241090 also mentioned previously. As shown, the polygonal mirror includes a ceramic ring 501, a yoke 502 and a rotor magnet 503 constructed integrally with each other by casting aluminum. After the surfaces of the ceramic ring 501, yoke 502 and rotor magnet 503 have been machined, mirror surfaces 504 are formed by vapor deposition. However, the magnet 503 mounted on the bottom of the mirror is apt to reduce the accuracy of the mirror surfaces due to a centrifugal force acting on the magnet 503 during high-speed rotation.

Figure 5:
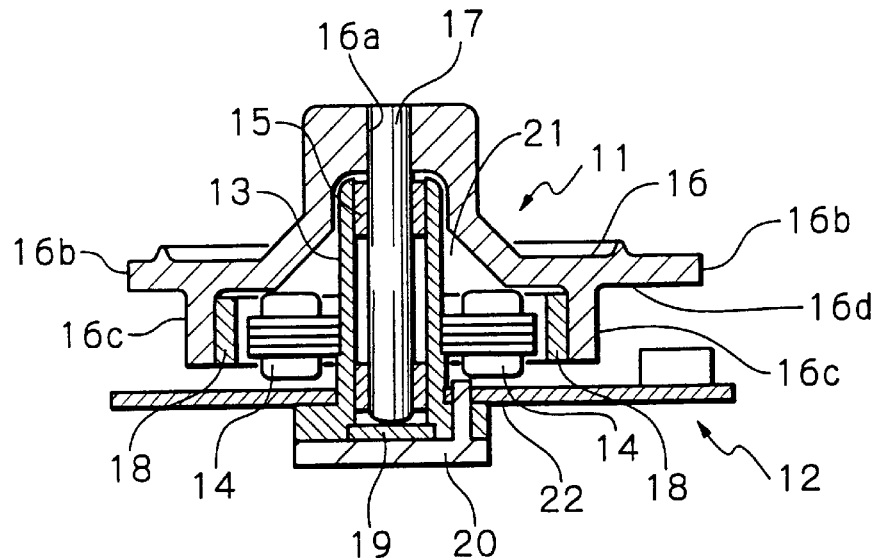
FIG. 5 is a sectional side elevation showing a first embodiment of a polygonal mirror type scanner in accordance with the present invention.
Figure 6:
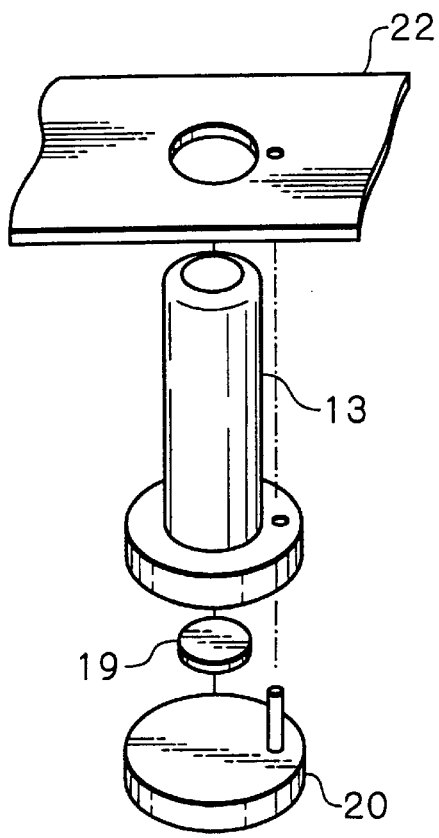
FIG. 6 is an exploded perspective view showing how a stator yoke included in a scanner motor of the first embodiment is mounted.

Referring to FIGS. 5 and 6, a first embodiment of the polygonal mirror type scanner in accordance with the present invention will be described. As shown, the scanner includes a brushless DC motor made up of a stator portion 12 and a rotor portion 11. The stator portion 12 has a stator yoke 13, a coil 14 affixed to the circumference of the stator yoke 13, and a bearing 15 disposed in the stator yoke 13.

The rotor portion 11 includes a rotor 16 formed with a center hole 16a in which a shaft 17 is press fitted. The rotor 16 has its circumference ground and polished in a regular polygonal configuration (pentagonal configuration in the embodiment), as seen in a plan view, so as to form mirror surfaces (square pillar sides) 16b. An annular thin portion 16c plays the role of mounting means for press fitting an annular multipolar magnet or element 18 on the bottom 16d, or first major surface, of the rotor 16 along the inner circumference thereof. There are also shown in FIGS. 5 and 6 a thrust bearing 19, a lid 20, a bore 21, and a base 22. The bore 21 allows the bearing 15 to be positioned between the mirror surfaces 16b.

The rotor portion 11 is rotatably supported by the bearing 15 of the stator portion 12 via the shaft 17. The multipolar magnet 18 and coil 14 face each other in the circumferential direction, constituting a brushless DC motor.

Figure 7:
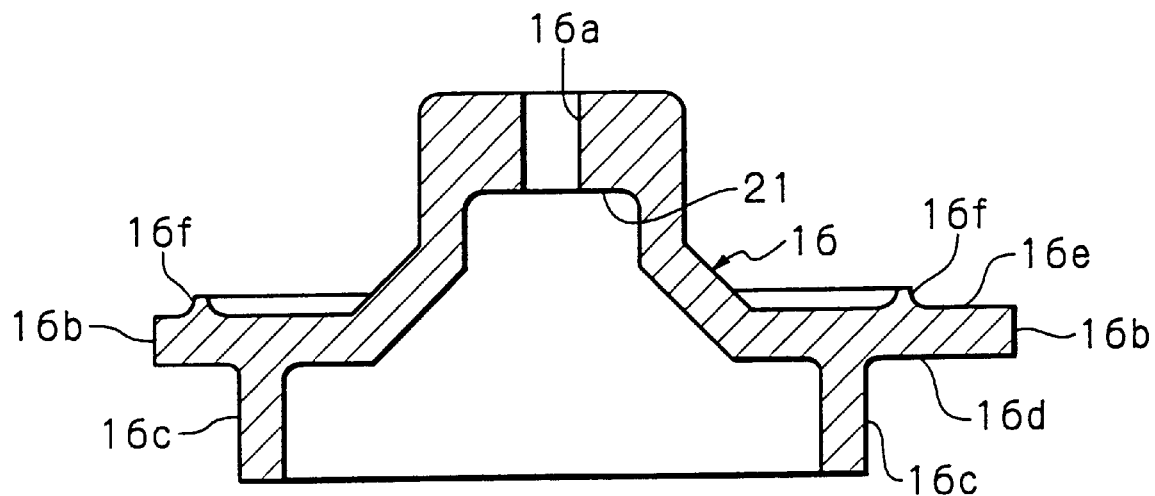
FIG. 7 is a sectional side elevation of the scanner motor of FIG. 6.
Figure 8:
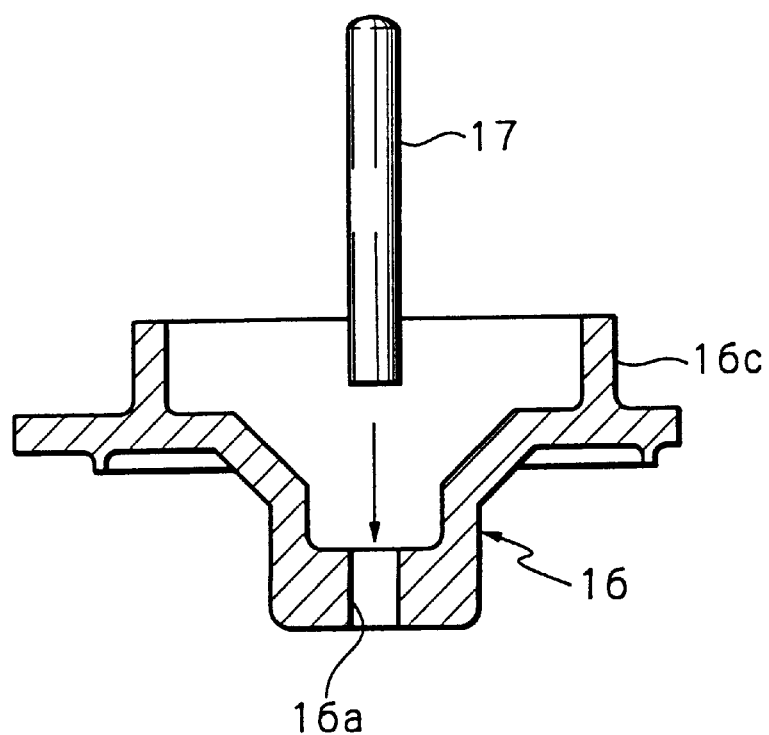
FIG. 8 demonstrates how a rotary shaft is press fitted in the center hole of a rotor in the first embodiment.

As also shown in FIGS. 7 and 8, the regular polygonal rotor 16 is formed of aluminum. In the illustrative embodiment, the rotor 16 has a regular pentagonal contour in a plan view, i.e., it has an upper or second major surface 16e and the lower major surface 16d both of which are regular pentagonal. The circumference of the rotor 16 is finished to form the pentagonal mirror surfaces 16b forming the contour of the rotor 16, thereby constituting a polygonal mirror. The shaft 17 is press fitted in the center hole 16a of the rotor 16 in the direction perpendicular to the rotor 16. The rotor 16 may, of course, be provided with any suitable regular polygonal contour other than the regular pentagonal contour.

The annular thin portion 16c of the rotor 16 protrudes downward from the bottom 16d of the rotor 16 and is concentric with the center hole 16a and shaft 17. The multipolar magnet 18 is press fitted along the inner circumference of the annular portion 16c.

The above rotor 16 with the mirror surfaces 16b makes it needless to affix mirror chips, films or similar members to the side of a rotor and thereby reduces the number of parts. In addition, the rotor 16 does not need highly accurate adhesion and is therefore free from the peeling of mirror surfaces ascribable to a centrifugal force.

The polygonal mirror is miniature because the mirror surfaces 16b are formed by machining the side of the rotor 16. The mirror therefore needs a minimum of exclusive space when mounted on a laser printer or similar image forming apparatus, thereby miniaturizing the entire apparatus.

Because the rotor 16 with the mirror surfaces 16b is formed of aluminum, the entire rotor portion 11 is lightweight. This is desirable in the aspect of oscillation and noise.

The annular thin portion 16c is formed on the bottom of the rotor 16 and allows the magnet 18 to be easily positioned concentrically with the shaft 17. In addition, the magnet 18 and shaft 17 are free from eccentricity. Eccentricity would disturb the dynamic balance and would thereby degrade the jitter characteristic while aggravating oscillation and noise.

Further, the annular thin portion 16c formed on the bottom of the rotor 16 facilitates the press fitting of the magnet 18 and accurately positions the magnet in the radial direction of the polygonal mirror. The magnet 18 is therefore prevented from coming off or being dislocated due to a centrifugal force.

The illustrative embodiment with the above mirrors 16b and magnet 18 free from peeling or dislocation achieves high durability. Further, the illustrative embodiment is extremely easy to produce and high quality because the mirror surfaces 16b do not need accurate adhesion and because the magnet 18 is easy to position.

The magnet 18 is press fitted in the rotor 16 having the mirror surfaces 16b. It is therefore likely that the resulting internal stress is imparted to the mirror surfaces 16b or that an internal stress ascribable to a centrifugal force is imparted to the mirror surfaces 16b. The illustrative embodiment solves this problem with the annular thin portion 16c of the rotor 16 offset relative to the mirror surfaces both in the radial and axial directions of the polygonal mirror. Because the mirror surfaces 16b are free from deformation ascribable to the internal stress derived from press fitting, the magnet 18 can be press fitted in the recess 16c after the finishing of the rotor 16.

To prevent the internal stress ascribable to press fitting from reaching the mirror surfaces 16b, the magnet 18 is press fitted in the annular thin portion 16c first. Subsequently, the rotor 16 may be annealed for removing hysteresis and then finished. This, however, needs an annealing step.

Figure 9:
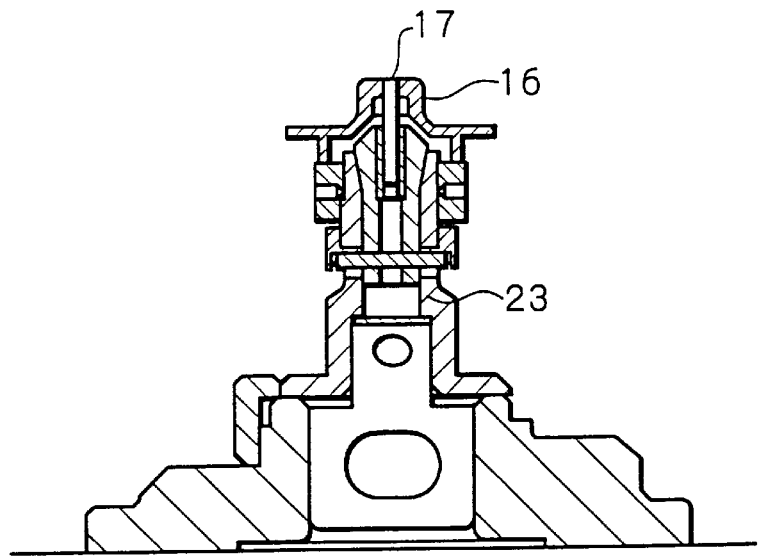
FIG. 9 is a sectional side elevation showing a condition wherein the rotor is supported by a jig for finishing the side of the rotor in a regular polygonal shape as seen in a plan view.

A specific procedure for producing the rotor 16 will be described hereinafter. As shown in FIGS. 7 and 8, a flat blank piece of aluminum is pressed to form the annular thin portion 16c. At the same time, the center hole 16c is formed in the blank piece with accuracy available with pressing. To form the annular portion 16c, the flat blank piece of aluminum may be replaced with a rod of aluminum. Subsequently, the shaft 17 is press fitted in the center hole 16a of the rotor 16. Thereafter, as shown in FIG. 9, a jig 23 grips the shaft 17 fitted in the center hole 16a, so that the circumference of the rotor 16 can be finished in a regular polygonal shape.

Figure 10A:
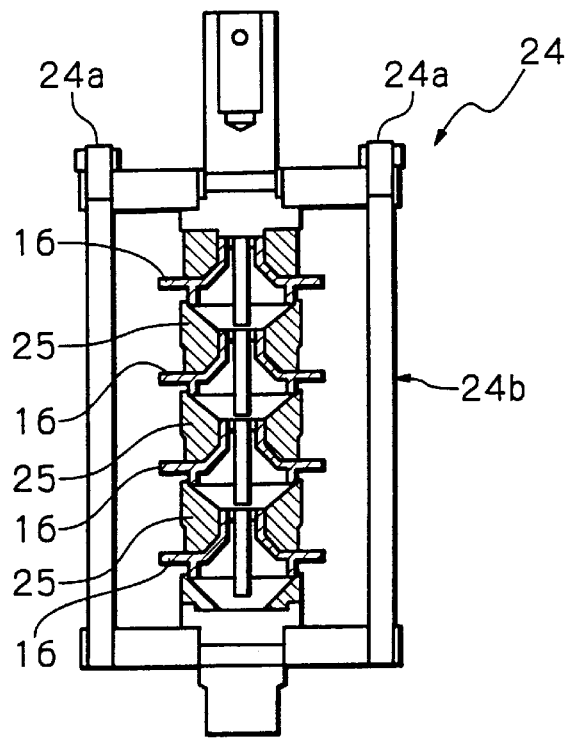
FIG. 10A is a sectional side elevation showing a plurality of rotors supported by a jig for rinsing and deposition.
Figure 10B:
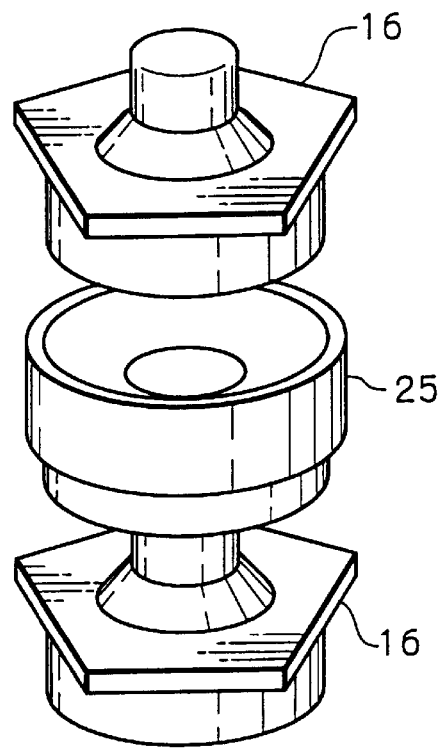
FIG. 10B is an exploded perspective view showing the jig and rotors.

FIG. 10A shows a plurality of rotors 16 supported by a jig 24 for rinsing and deposition. FIG. 10B shows a collar 25 intervening between the rotors 16. As shown in FIG. 10A, the rotors 16 and collars 25 are stacked alternately and fastened together by a frame 24b and wing screws 24a. Specifically, after mirror surfaces have been formed on the rotors 16, the rotors are mounted to the jig 24 and then rinsed in a bath for removing machining oil. Thereafter, the rotors 16 are introduced in a deposition apparatus together with the jig 24 in order to form protection films for protecting the mirror surfaces.

Figure 11:
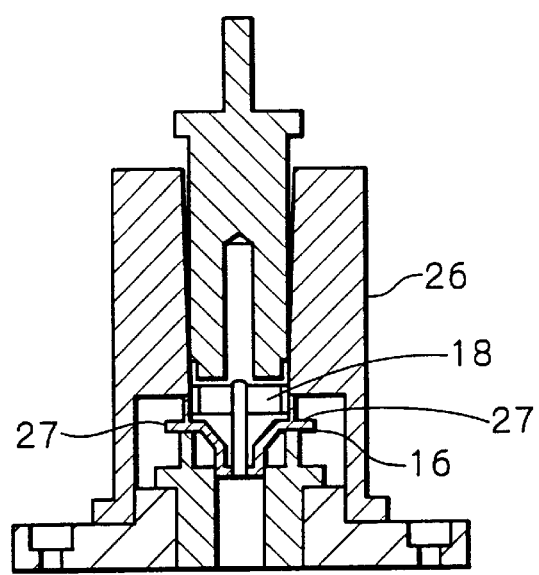
FIG. 11 is a sectional side elevation showing a multipolar magnet being press fitted along the inner circumference of an annular projection included in the rotor.

FIG. 11 shows how the multipolar magnet 18 is press fitted along the inner circumference of the annular projection of the rotor 16. As shown, the magnet 18 is held by a jig 26 and inserted into the annular projection of the rotor 16 provided with the mirror surfaces 16b. This may be done before forming the mirror surfaces on the rotor 16, if desired.

In the condition shown in FIG. 11, a gap 27 exists between the polygonal bottom 16d of the rotor 16, as seen in a plan view, and the magnet 18 in the direction in which the magnet 18 is press fitted. The gap 27 prevents the force press fitting the magnet 8 from effecting the configuration of the mirror surfaces 16b.

Figure 12:
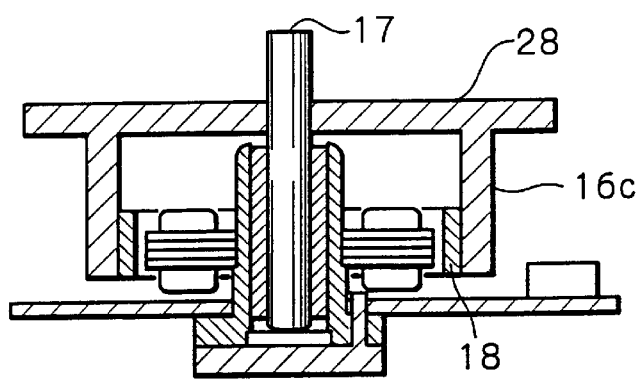
FIGS. 12 and 13 are sectional side elevations respectively showing a second and a third embodiment of the present invention.

FIG. 12 shows a rotor 28 representative of a second embodiment of the present invention. As shown, this embodiment is identical with the first embodiment except for the configuration of the rotor 28.

Figure 13:
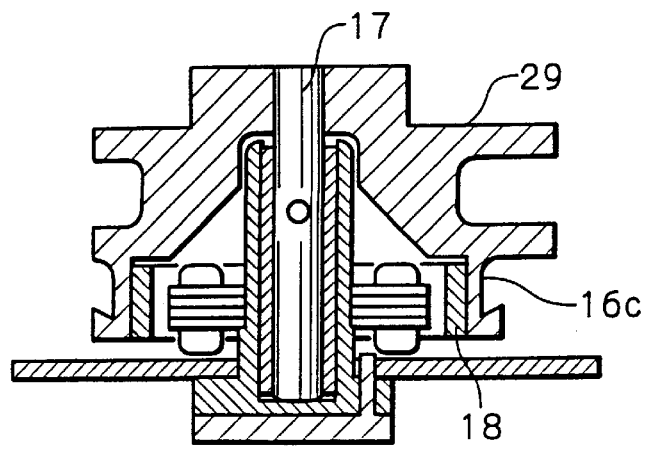

FIG. 13 shows a rotor 29 representative of a third embodiment of the present invention. As shown, this embodiment is also identical with the first embodiment except for the configuration of the rotor 29.

As stated above, the first to third embodiments make it needless to highly accurately position or adhere, e.g., a magnet and allow the mirror surfaces of a polygonal mirror to be positioned at the same distance from the axis of rotation without resorting to mirror chips, films or similar members. Consequently, there can be implemented a rotary body having reflection points free from dislocation relative to the axis of rotation and maintaining stable performance despite aging. Further, the rotor not needing, e.g., mirror chips separate from the rotor needs a minimum number of parts.

Figure 14:
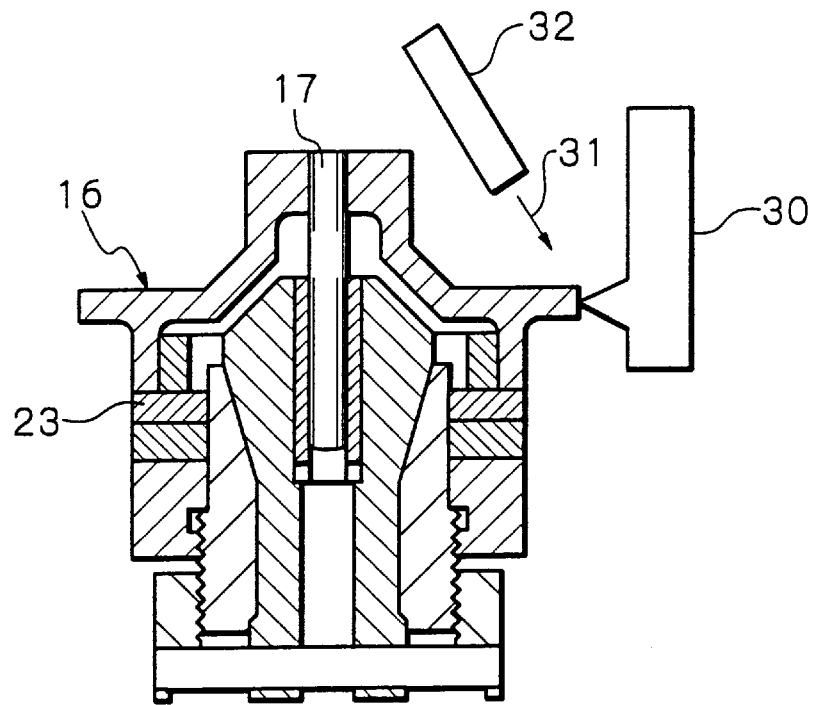
FIG. 14 is a sectional side elevation showing an arrangement for machining the rotor of the scanner motor included in the first embodiment.

FIG. 14 shows how the rotor 16 is machined to form the mirror surfaces. As shown, to form the mirror surfaces, a diamond tool affixed to a rotary spindle 30 cuts the circumference of the rotor 16. At this instant, machining oil 31 containing kerosene is sprayed from a nozzle 32 toward the cutting point in order to suppress the temperature elevation of the diamond tool and to prevent the resulting chips from adhering to the tool.

Figure 15:
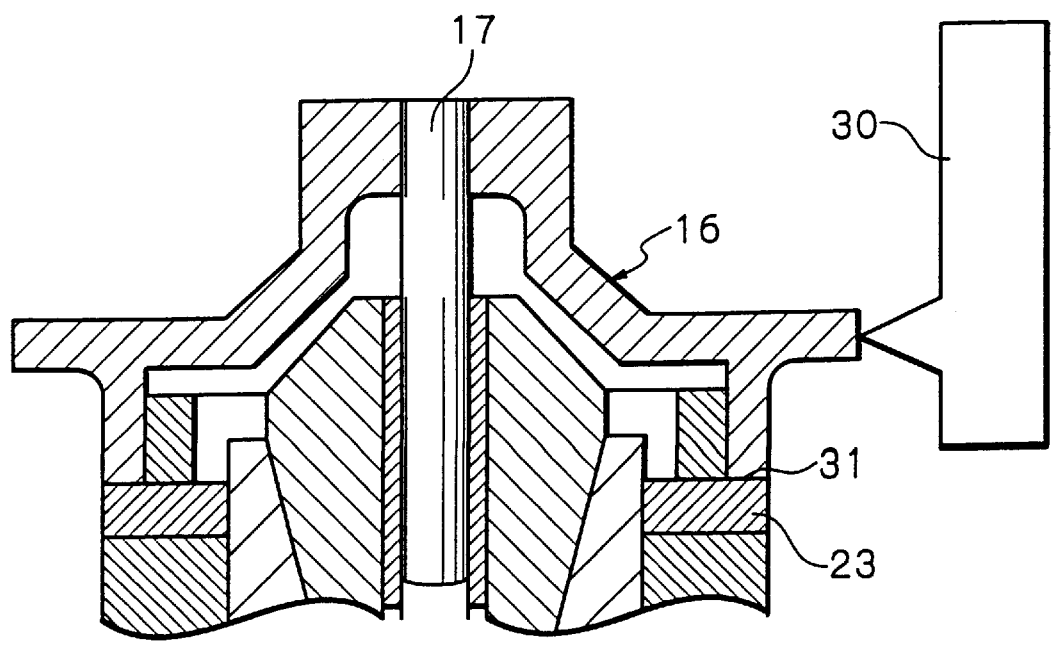
FIG. 15 is a view showing how machining oil penetrates.

The machining oil 31 would cause the magnet formed of plastics to soften and swell. In light of this, as shown in FIG. 14, the bottom of the rotor 16 is held in contact with the jig 23. However, as shown in FIG. 15, the oil 31 penetrates to the interface between the jig 23 and the rotor 26 due to capillarity and reaches the inner circumference of the rotor 16 although in a small amount.

Figure 16:
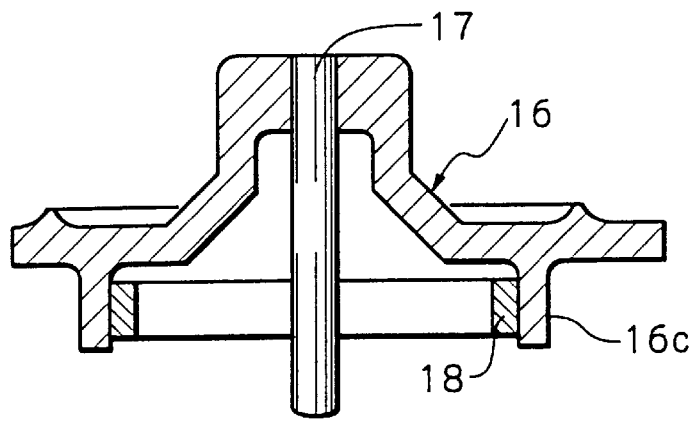
FIG. 16 is a sectional side elevation showing a fourth embodiment of the present invention.

FIG. 16 shows a fourth embodiment of the present invention constructed to prevent the above machining oil 31 from reaching the magnet 18. As shown, the bottom of the magnet 18 press fitted in the annular thin portion 16c of the rotor 16 is positioned above the bottom of the annular portion 16c.

Figure 17A:
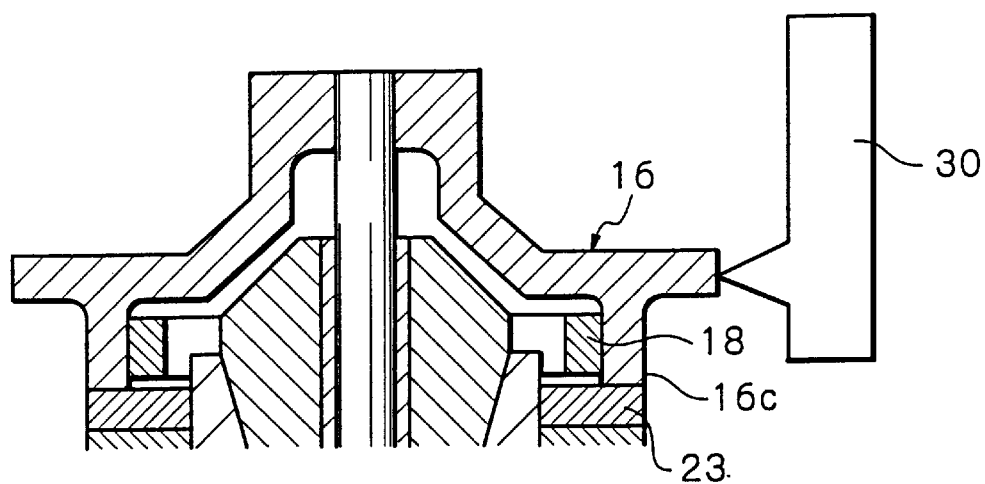
FIG. 17A a sectional side elevation showing an arrangement for machining a rotor included in the fourth embodiment.
Figure 17B:
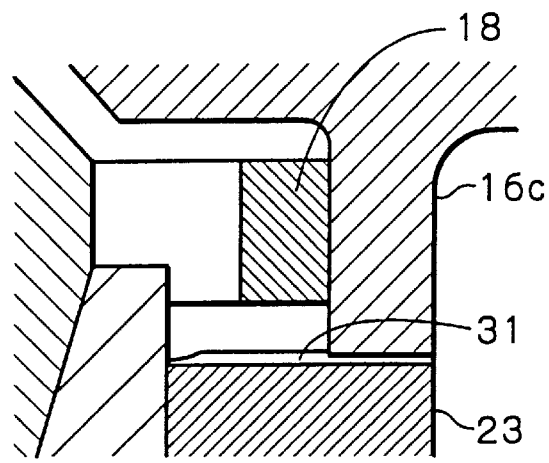
FIG. 17B is a view showing how machining oil penetrates.

FIG. 17A shows how the circumference of the rotor 16 included in the fourth embodiment is machined. FIG. 17B shows the penetration of the machining oil 31. As shown, although the oil 31 reaches the interface between the jig 23 and the rotor 16 due to capillarity, it is prevented from rising to the magnet 18 against gravity because the bottom of the magnet 18 is positioned above the bottom of the annular portion 16c.

Figure 18:
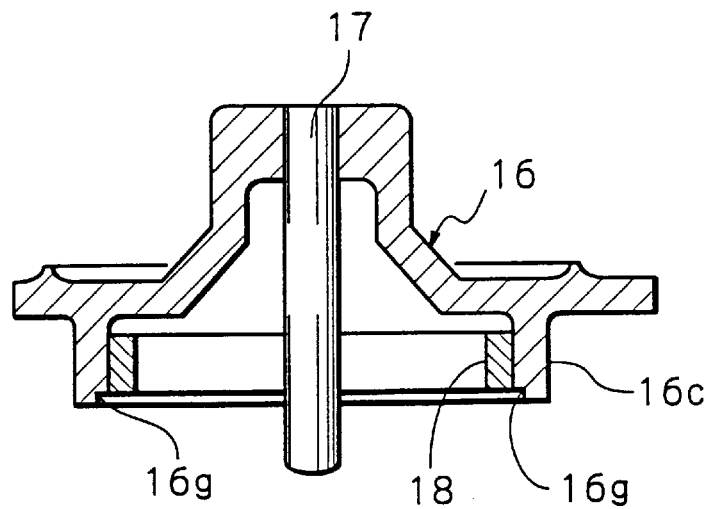
FIGS. 18, 19 and 20 are sectional side elevations respectively showing a fifth, a sixth and a seventh embodiment of the present invention.

FIG. 18 shows a fifth embodiment of the present invention. As shown, a stepped portion 16g is formed in the inner circumference of the rotor 16 below the magnet 18.

Figure 19:
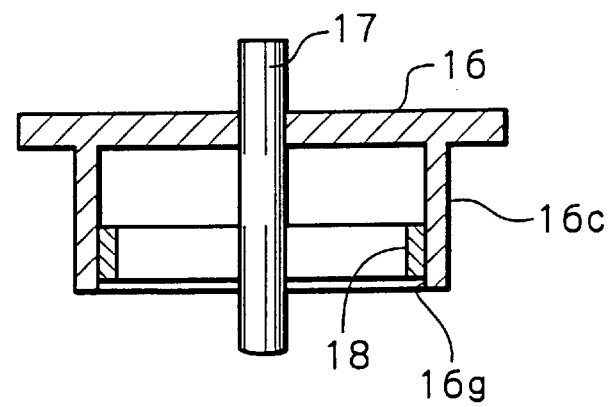

FIG. 19 shows a sixth embodiment of the present invention. This embodiment is identical with the fourth embodiment of FIG. 16 except for the configuration of the rotor 16.

Figure 20:
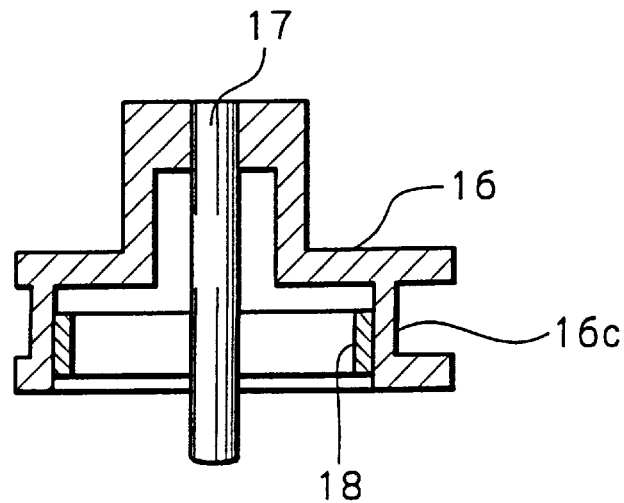

FIG. 20 shows a seventh embodiment of the present invention. This embodiment is identical with any one of the embodiments shown in FIGS. 16 and 19 except for the configuration of the rotor 16.

As stated above, the fourth to seventh embodiments each are capable of machining the rotor while protecting the magnet press fitted in the annular thin portion of the rotor from the influence of the machining oil. It follows that there can be implemented a rotary body having mirror surfaces positioned at the same distance from the axis of rotation. Such a rotary body has the same advantages as stated in relation to the first to third embodiments.

Figure 21:
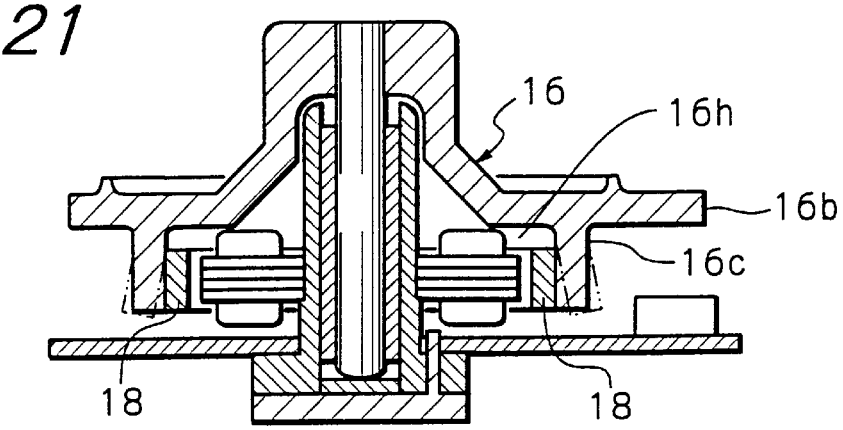
FIG. 21 is a sectional view demonstrating how the first embodiment protects mirror surfaces from the influence of a centrifugal force during high-speed rotation.

Reference will be made to FIG. 21 for describing how the first embodiment prevents the mirror surfaces of the polygonal mirror from being effected by the centrifugal force of the magnet 18. As shown, the centrifugal force ascribable to the rotation of the magnet 18 tends to deform the annular thin portion 16c outward away from the center of rotation. However, a gap 16h between the bottom of the rotor 16 and the top of the magnet 18 successfully prevents the force acting on the annular portion 16c from being imparted to the mirror surfaces 16b. The mirror surfaces 16b are therefore free from deformation. In addition, the entire scanner is capable of maintaining the expected jitter characteristic.

Figure 22:
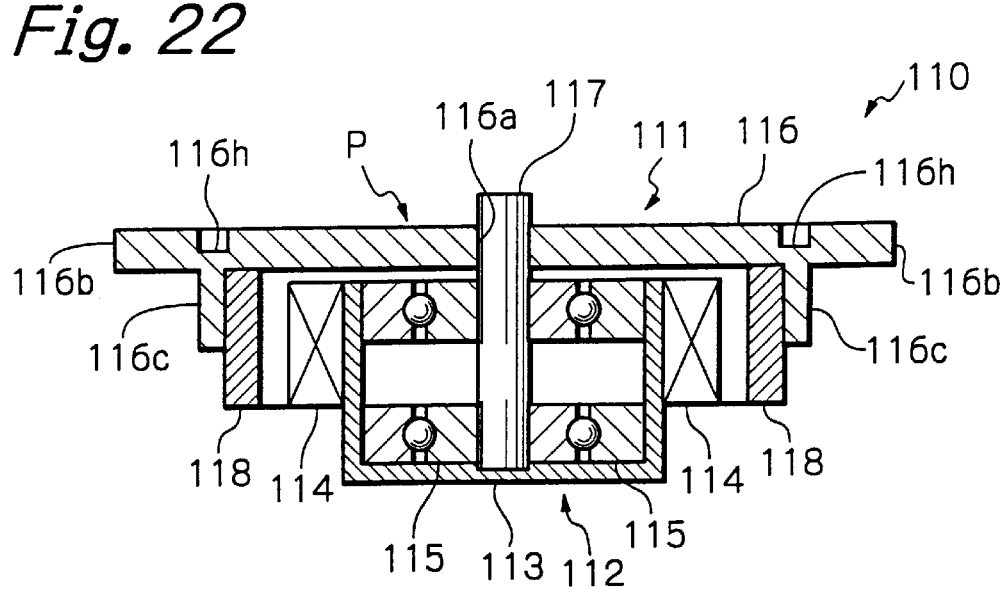
FIG. 22 is a sectional side elevation showing an eighth embodiment of the present invention.
Figure 23:
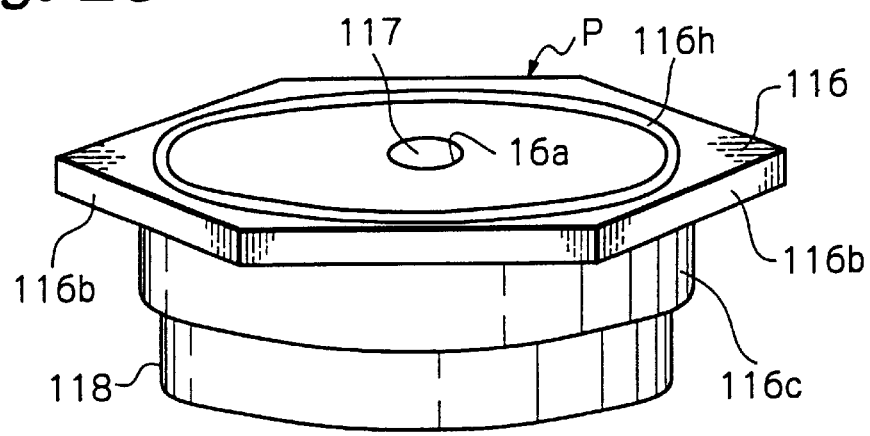
FIG. 23 is an external perspective view showing a rotor included in the eighth embodiment.

Referring to FIGS. 22 and 23, an eighth embodiment of the present invention will be described. As shown, a polygonal mirror type scanner, generally 110, includes a brushless DC motor made up of a stator portion 112 and a rotor portion 111. The stator portion 112 has a stator yoke 113, a coil 114 affixed to the circumference of the stator yoke 113, and a bearing 115 disposed in the stator yoke 113.

The rotor portion 111 includes a rotor 116 formed with a center hole 116a in which a shaft 117 is press fitted. The rotor 116 has its circumference ground and polished in a regular polygonal configuration, as seen in a plan view, so as to form mirror surfaces (square pillar sides) 116*b*. An annular thin projection 116 is formed in the bottom or one major surface of the rotor 116. An annular multipolar magnet 118 is press fitted along the inner circumference of the projection 116. An annular recess 116*h* is formed in the top or other major surface of the rotor 116 for receiving the lower portion of the projection 116*c*, as will be described specifically later.

The rotor portion 111 is rotatably supported by the bearing 115 of the stator portion 115 via the shaft 117. The multipolar magnet 118 and coil 114 face each other in the circumferential direction, constituting a brushless DC motor.

The regular polygonal rotor 116 is formed of aluminum. In the illustrative embodiment, the rotor 116 has a regular hexagonal contour in a plan view, i.e., it has an upper and a lower major surface both of which are regular hexagonal. The circumference of the rotor 116 is machined to form the hexagonal mirror surfaces 116*b* forming the contour of the rotor 116, thereby constituting a polygonal mirror P. The shaft 117 is press fitted in the center hole 116*a* of the rotor 116 in the direction perpendicular to the rotor 116.

The annular projection 116*c* protrudes from the bottom of the rotor 116 and is concentric with the center hole 116*a* and shaft 117. The multipolar magnet 118 is press fitted in the recess 116*c*. The annular recess 116*h* formed in the top of the rotor 116 is also concentric with the center hole 116*a* and shaft 117. The recess 116*h* obviates deformation ascribable to a fastening force, as will be described specifically later.

The annular projection 116*c* may alternatively be formed on the top of the rotor 116 concentrically with the center hole 116*a* and shaft 117. In such a case, the magnet 118 will also be press fitted along the inner circumference of the projection 116*c*.

The projection 116*c* of the rotor 116 is offset relative to the mirror surfaces 116*b* in both of the radial and axial directions of the polygonal mirror P. That is, the projection 116*c* is closer to the axis of rotation than the mirror surfaces 116*b* by a preselected distance in the radial direction and does not face the mirror surfaces 116*b* in the axial direction.

As shown in FIGS. 22 and 23, the projection 116*c* has a smaller axial length than the magnet 118 and can therefore scatter a force to be imparted from the magnet 118 to the rotor 116 at the time of press fitting of the magnet 118. This is also successful to release the internal stress.

In the above scanner 110, the rotor 116 with the mirror surfaces 116*b* makes it needless to affix mirror chips, films or similar members to the side of a rotor and thereby reduces the number of parts. In addition, the rotor 116 does not need highly accurate adhesion and is therefore free from the peeling of mirror surfaces ascribable to a centrifugal force.

The polygonal mirror P is miniature because the mirror surfaces 116*b* are formed by machining the side of the rotor 116. The mirror P therefore needs a minimum of exclusive space when mounted to a laser printer or similar image forming apparatus, thereby miniaturizing the entire image forming apparatus.

Because the rotor 116 with the mirror surfaces 116*b* is formed of aluminum, the entire rotor portion 111 is lightweight. This is desirable in the aspect of oscillation and noise.

The annular projection 116*c* is formed on the bottom of the rotor 116 and allows the magnet 118 to be easily positioned concentrically with the shaft 117. In addition, the magnet 118 and shaft 117 are free from eccentricity. Eccentricity would disturb the dynamic balance and would thereby degrade the jitter characteristic while aggravating oscillation and noise.

Further, the annular projection 116*c* formed on the bottom of the rotor 116 facilitates the press fitting of the magnet 118 and accurately positions the magnet in the radial direction of the polygonal mirror P. The magnet 118 is therefore prevented from coming off or being dislocated due to a centrifugal force.

The illustrative embodiment with the above mirrors 116*b* and magnet 118 free from peeling or dislocation achieves high durability. Further, the illustrative embodiment is extremely easy to produce and high quality because the mirror surfaces 116*b* do not need accurate adhesion and because the magnet 118 is easy to position.

The magnet 118 is press fitted in the rotor 116 having the mirror surfaces 116*b*. It is therefore likely that the resulting internal stress is imparted to the mirror surfaces 116*b* or that an internal stress ascribable to a centrifugal force is imparted to the mirror surfaces 116*b*. The illustrative embodiment solves this problem with the projection 116*c* offset relative to the mirror surfaces 11*b* both in the radial and axial directions of the polygonal mirror P. Because the mirror surfaces 116*b* are free from deformation ascribable to the internal stress derived from press fitting, the magnet 118 can be press fitted after the finishing of the rotor 116.

To prevent the internal stress ascribable to press fitting from reaching the mirror surfaces 116*b*, the magnet 118 is press fitted in the annular thin portion 116*c* first. Subsequently, the rotor 116 may be annealed for removing hysteresis and then finished. This, however, needs an annealing step.

Figure 24A:
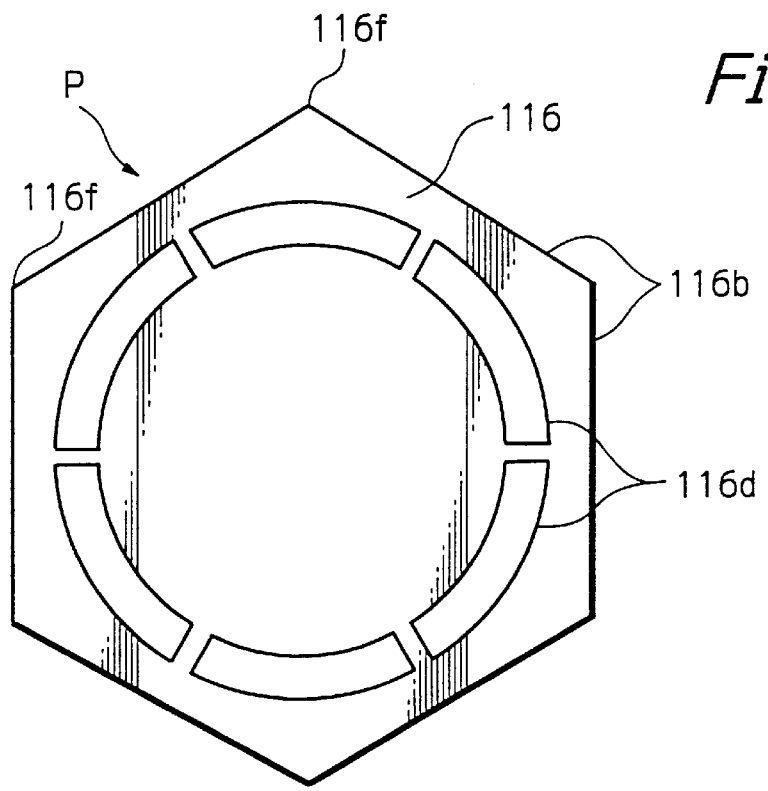
FIGS. 24A and 24B are bottom views each showing a particular modification of a projection included in the rotor of FIG. 23.
Figure 24B:
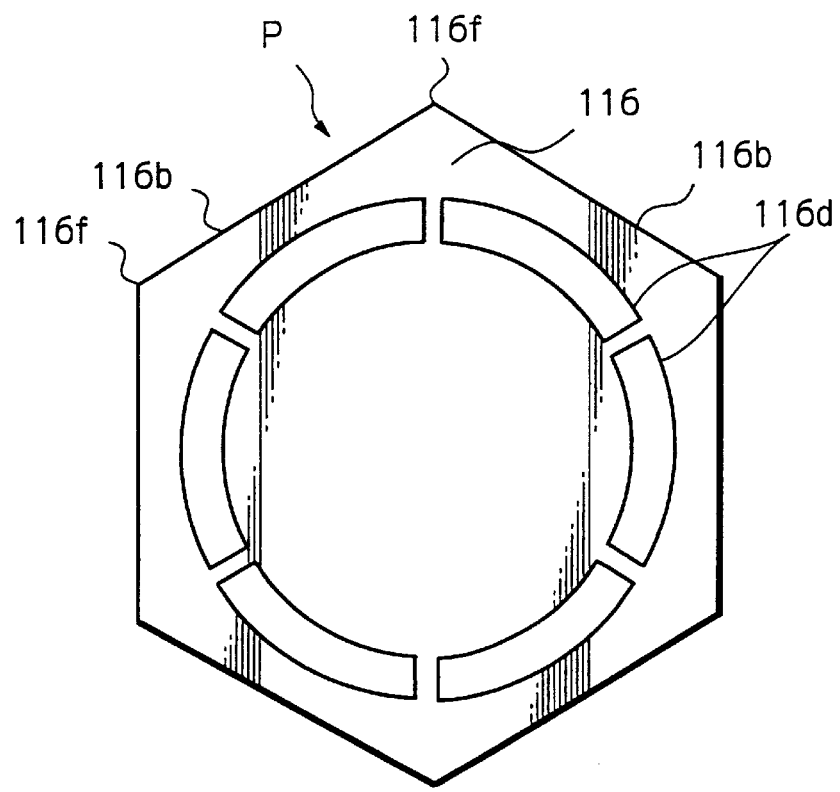

FIGS. 24A and 24B each show a specific modification of the annular projection 116*c* included in the polygonal mirror P. In FIG. 24A, the projection 116*c* is divided into six arcuate portions 116*d* identical in configuration in the circumferential direction. The centers of the six arcuate portions 116*d* each correspond to one apex 116*f* of the mirror P. If desired, the six portions 116*d* may each be bisected to form twelve portions in total. That is, when the regular polygon has n sides, the projection 116*c* should preferably be divided by a x n (n being a natural number) from the dynamic balance standpoint. The configuration shown in FIG. 24A promotes the deformation of the projections 116*d* at the time of press fitting of the magnet 118. In addition, the polygonal mirror P can be formed of a sparingly deformable material.

As shown in FIG. 24B, the arcuate portions 116*d* may be positioned such that portions between the nearby arcuate portions 116*d* correspond to the apexes of the mirror P.

Figure 25:
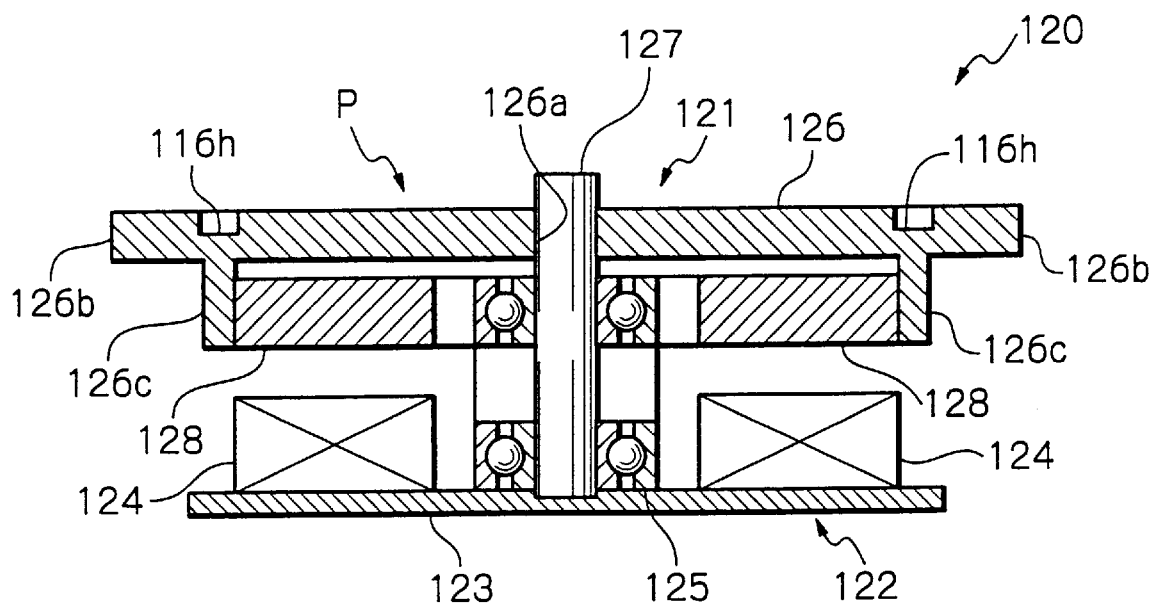
FIGS. 25, 26, 27 and 28 are sectional side elevations respectively showing a ninth, a tenth, an eleventh and a twelfth embodiment of the present invention.

FIG. 25 shows a ninth embodiment of the present invention. As shown, a polygonal mirror type scanner, generally 120, includes a brush less DC motor made up of a stator portion 122 and a rotor portion 121. The stator portion 122 has a stator yoke 123, a coil 124 affixed to the top of the stator yoke 123, and a bearing 125 positioned at the center of the stator yoke 123.

The rotor portion 121 includes a rotor 126 formed with a center hole 126*a* in which a shaft 127 is press fitted. The rotor 126 has its circumference ground and polished in a regular polygonal configuration, as seen in a plan view, so as to form mirror surfaces (square pillar sides) 126*b*. An annular projection 126*c* is formed on the bottom or one major surface of the rotor 126 for press fitting an annular multipolar magnet 128 along the inner circumference thereof. An annular recess 116*h* is formed in the top of the rotor 126 for receiving the lower portion of the projection 126c, as will be described later specifically. The rotor portion 121 is rotatably supported by the bearing 125 of the stator portion 122 via the shaft 127. The multipolar magnet 128 and coil 124 face each other, constituting a brushless DC motor.

The regular polygonal rotor 126, like the rotor 16 of the first embodiment, is formed of aluminum. In the illustrative embodiment, the rotor 126 has a regular hexagonal contour in a plan view, i.e., it has an upper and a lower major surface both of which are regular hexagonal. The circumference of the rotor 126 is machined to form the mirror surfaces 126b forming the contour of the rotor 126, thereby constituting a polygonal mirror P. The shaft 127 is press fitted in the center hole 126a of the rotor 126 in the direction perpendicular to the rotor 126. Again, the rotor 126 may be provided with any suitable regular polygonal contour other than the regular hexagonal contour.

The annular projection 126c formed on the bottom of the rotor 126 is concentric with the center hole 126a and shaft 127. The magnet 128 is press fitted along the inner circumference of the projection 126c. Again, the projection 126c is offset relative to the mirror surfaces 126b in both of the radial and axial directions of the mirror P. That is, the projection 126c is closer to the axis of rotation than the mirror surfaces 126b in the radial direction and does not face the mirror surfaces 126b in the axial direction.

Figure 26:
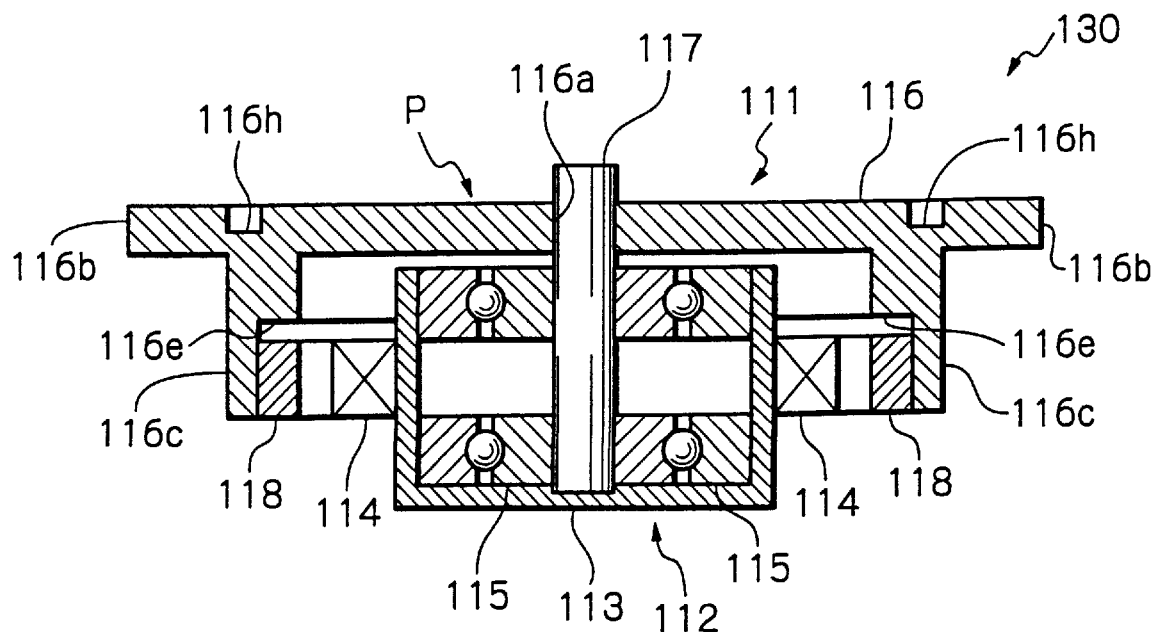

FIG. 26 shows a tenth embodiment of the present invention. As shown, a polygonal mirror type scanner, generally 130, is identical with the scanner 110 of FIG. 22 except for the following. The inner circumference of the projection 116c is formed with a notch 116e for facilitating the deformation of the projection 116c when the magnet 118 is press fitted.

Figure 27:
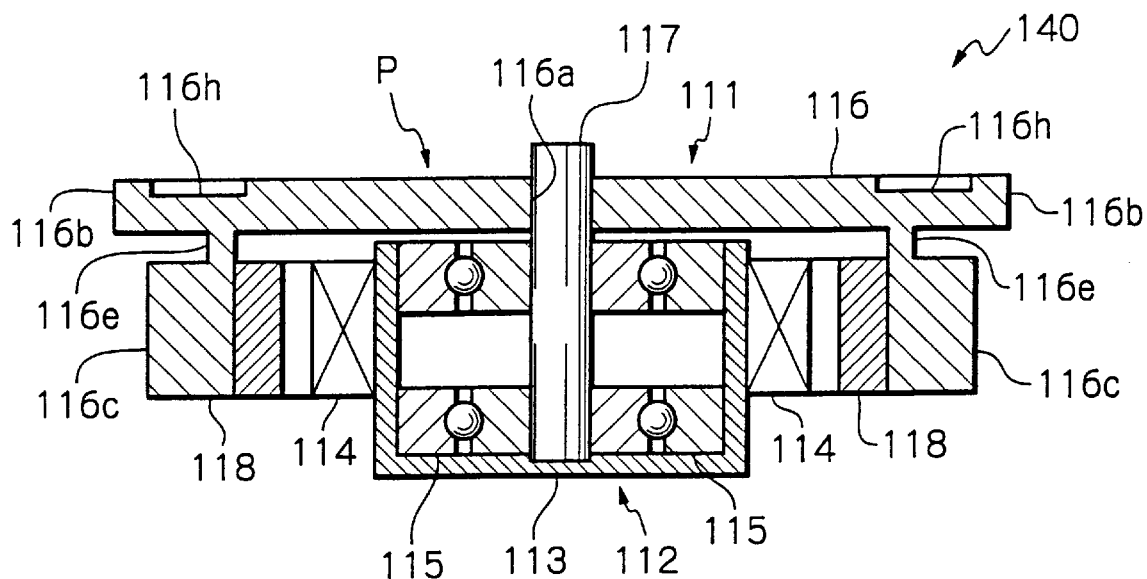

FIG. 27 shows an eleventh embodiment of the present invention. As shown, a polygonal mirror type scanner, generally 140, is also identical with the scanner 110 of FIG. 22 except that the outer circumference of the projection 116c is formed with a notch 116e for facilitating the deformation of the projection 116c.

Figure 28:
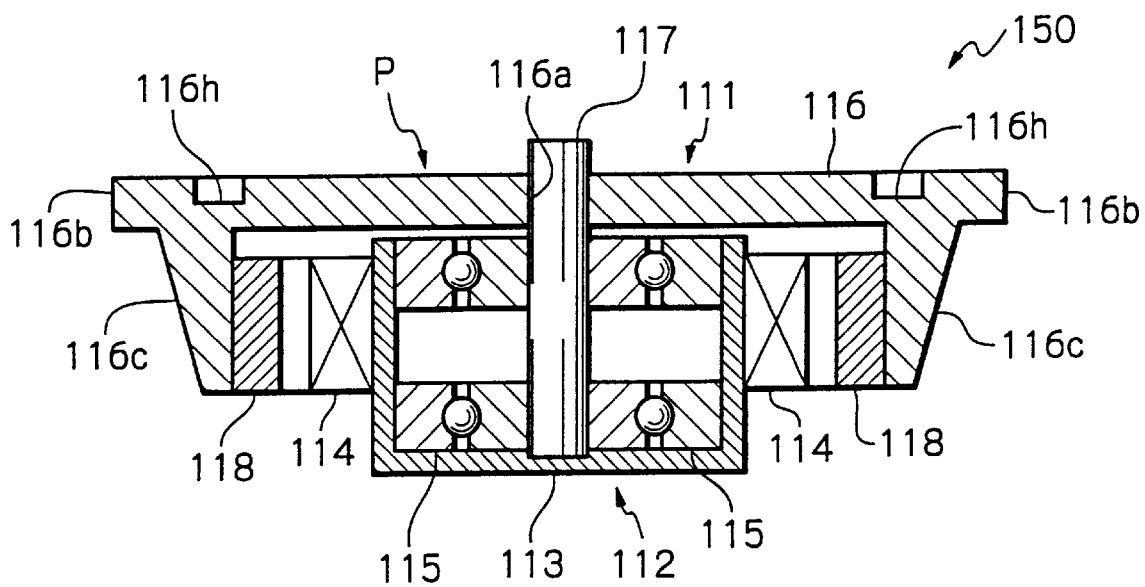

FIG. 28 shows a twelfth embodiment of the present invention. As shown, a polygonal mirror type scanner, generally 150, is also identical with the scanner 110 of FIG. 22 except that the outer circumference of the projection 116c is tapered downward for facilitating the deformation of the projection 116c.

The above embodiments shown in FIGS. 26–28 are similarly practicable with the brushless motor of the type shown in FIG. 25.

Figure 29A:
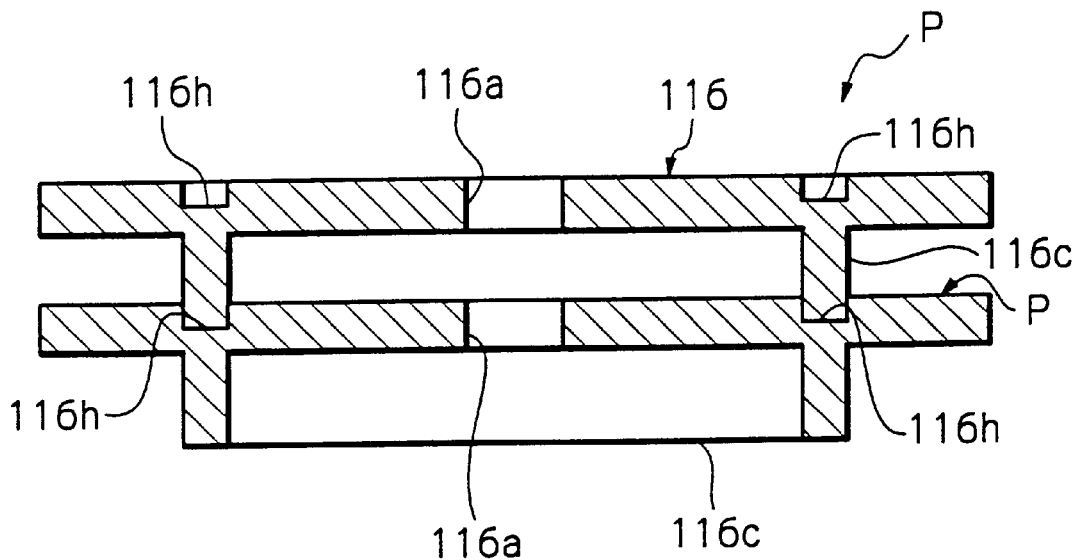
FIG. 29A is a sectional view showing a stack of blank pieces expected to form a modification of the polygonal mirror.

A specific procedure for forming the mirror surfaces 116b on the rotor 116 will be described with reference to FIGS. 29A and 29B. As shown in FIG. 29A, blank pieces p expected to form the polygonal mirrors P are stacked one upon the other. Each blank piece p includes the annular projection 116c protruding downward from the rotor 116 for press fitting the multipolar magnet 118, not shown, and the annular recess 116h formed in the top of the rotor 116. The recess 116h is engaged with the projection 116c of the overlying blank piece p. Each recess 116h has a depth smaller than the axial length of each projection 116c. In this configuration, the rotors 116 of the blank pieces p are positioned in the axial and radial directions without contacting each other, but with the inner periphery of each recess 116h contacting the lower portion of the associated projection 116c. Because the rotors 116 do not contact each other, they are free from scratches during machining.

Figure 29B:
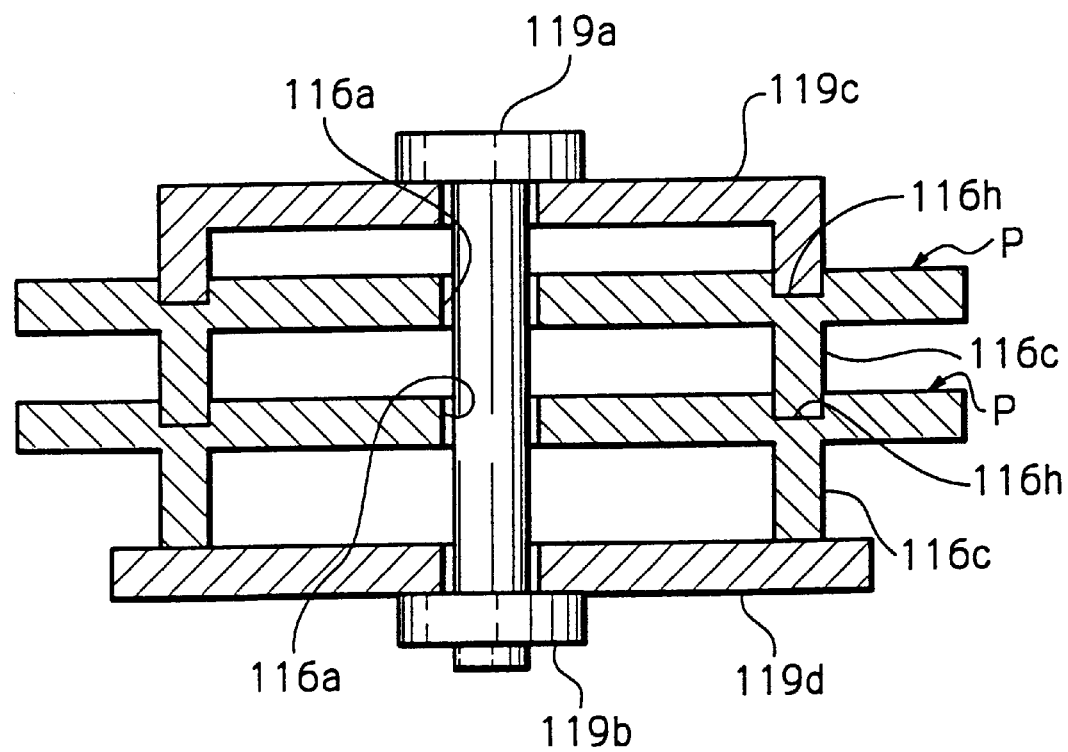
FIG. 29B is a sectional view showing the blank pieces fastened together.

As shown in FIG. 29B, the blank pieces p stacked together are held between a flat first jig 119c and a second jig 119d. The first jig 119c has its end received in the recess 116h of the top blank piece p. The second jig 119d contacts the lower end of the projection 116c of the bottom blank piece p. A bolt-like fastening member 119a is inserted in the center holes of the two jigs 119c and 119d and the center holes 116a of the blank pieces p. Subsequently, a nut-like fastening member 119b is fitted on the fastening member 119a to thereby fasten the above stack. In this condition, the circumferences of the blank pieces p can be machined together to form the mirror surfaces 116b. This successfully reduces the number of machining steps and thereby promotes efficient machining. In addition, the fastening means 119a and 119b exert a fastening force on the blank pieces p linearly in parallel to the axis of the stack, freeing the resulting polygonal mirrors from deformation.

Figure 30:
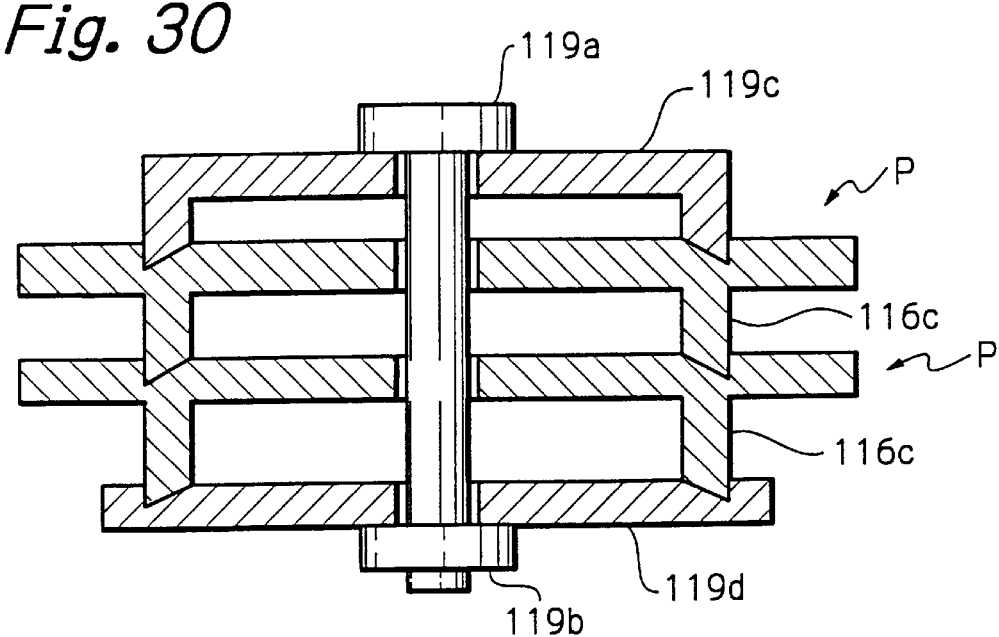
FIG. 30 is a sectional view showing a stack of blank pieces expected to form another modification of the polygonal mirror.
Figure 31:
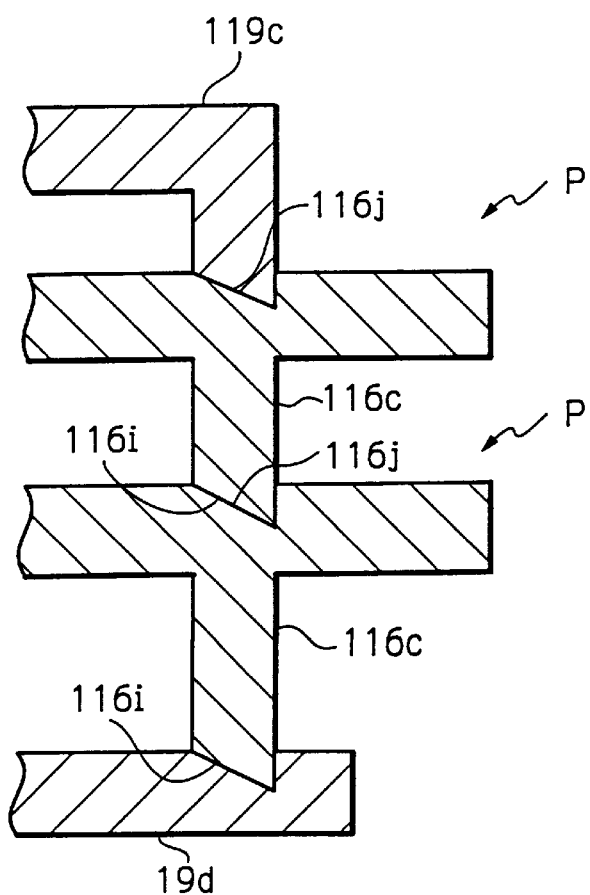
FIG. 31 is an enlarged sectional view of the stack shown in FIG. 30.

FIGS. 30 and 31 show a procedure for machining a stack of rotors each having a modified configuration. As shown, each blank piece p has its lower end inclined toward the center, i.e., implemented as an annular tapered surface 116i whose inside diameter sequentially increases toward the bottom. The bottom of the annular recess is implemented as a tapered surface 116j tapered complementarily to the tapered surface 116l, as illustrated. In this configuration, the internal stress ascribable to the fastening force and imparted from the projection 116c to the recess is directed toward the center, so that the mirror surfaces are free from deformation. Further, the inclined surface 116i serves to guide the magnet being inserted into the projection 116c. In addition, the inclined surface 116i facilitates the removal of the blank piece p from the underlying blank piece p. If desired, a gap may be formed between the outer circumference of the projection 116c and that of the recess 116h in order to obviate the internal stress more positively.

Figure 32:
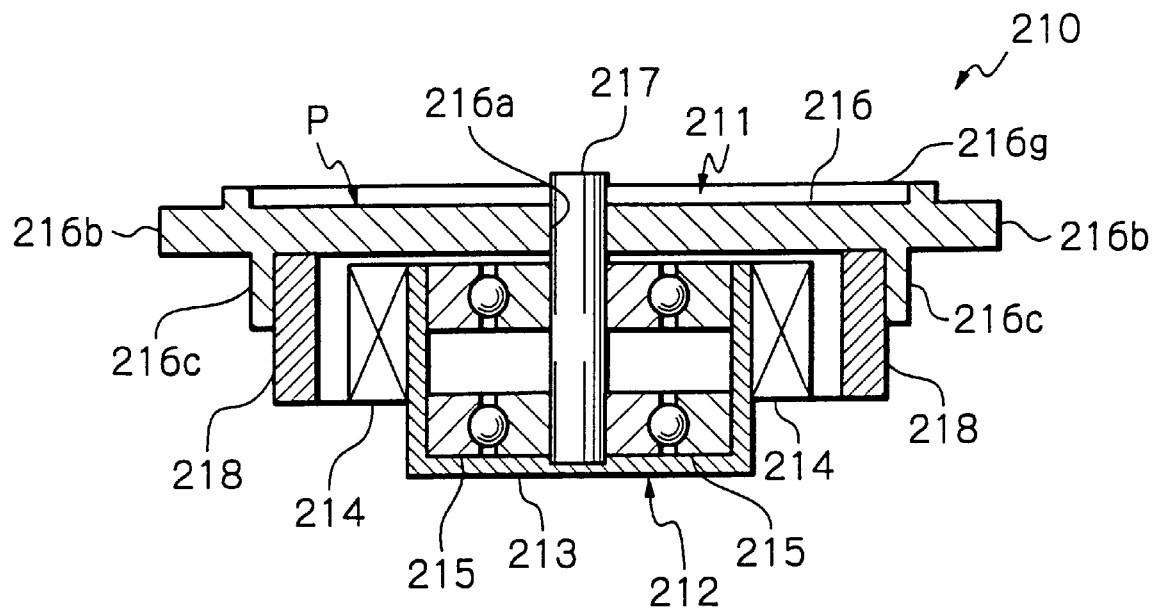
FIG. 32 is a sectional side elevation showing a thirteenth embodiment of the present invention.

Reference will be made to FIG. 32 for describing a thirteenth embodiment of the present invention. As shown, a polygonal mirror type scanner, generally 210, includes a brushless DC motor made up of a stator portion 212 and a rotor portion 211. The stator portion 212 has a stator yoke 213, a coil 214 affixed to the circumference of the stator yoke 213, and a bearing 215 disposed in the stator yoke 213.

The rotor portion 211 includes a rotor 216 formed with a center hole 216a in which a shaft 217 is press fitted. The rotor 216 has its circumference ground and polished in a regular polygonal configuration, as seen in a plan view, so as to form mirror surfaces (square pillar sides) 216b. An annular projection 216c is formed on the bottom or one major surface of the rotor 216 for press fitting a multipolar magnet 28 along the inner circumference thereof. A projection 216g protrudes from the top or other major surface of the rotor 216.

The rotor portion 211 is rotatably supported by the bearing 215 of the stator portion 212 via the shaft 217. The multipolar magnet 218 and coil 214 face each other in the circumferential direction, constituting a brushless DC motor.

The regular polygonal rotor 216 is formed of aluminum. In the illustrative embodiment, the rotor 216 has a regular hexagonal contour in a plan view, i.e., it has an upper and a lower major surface both of which are regular hexagonal. The circumference of the rotor 216 is machined to form the mirror surfaces 216b forming the contour of the rotor 216, thereby constituting a polygonal mirror P. The shaft 217 is press fitted in the center hole 216a of the rotor 216 in the direction perpendicular to the rotor 216. Again, the rotor 216 may be provided with any suitable regular polygonal contour other than the regular hexagonal contour.

The annular projection 216c formed on the bottom of the rotor 216 is concentric with the center hole 216a and shaft 217. The magnet 218 is press fitted along the inner circumference of the projection 216c. An annular projection 21 6g protrudes from the top of the rotor 216 concentrically with the center hole 216a and shaft 217.

The above projection 216c is offset relative to the mirror surfaces 216b in both of the radial and axial directions of the polygonal mirror P. That is, the projection 216c is closer to the center than the mirror surfaces 216b by a preselected distance in the radial direction and does not face the mirror surfaces 216b in the axial direction.

Figure 33:
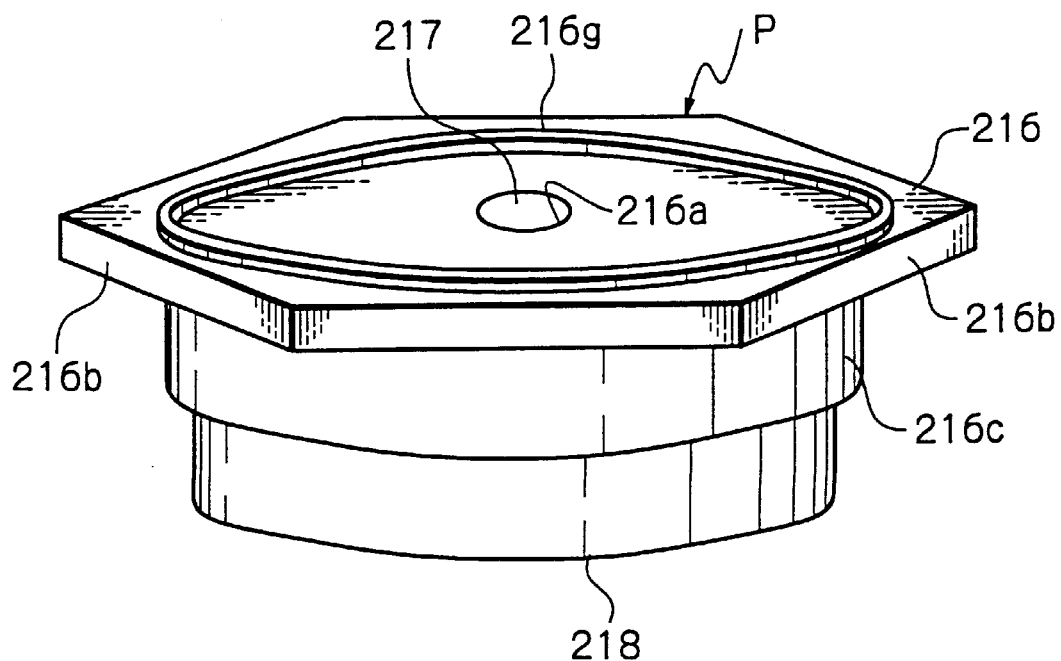
FIG. 33 is an external perspective view showing a rotor included in the thirteenth embodiment.

As shown in FIGS. 32 and 33, the projection 216c has an axial length smaller than the length of the magnet 218. The projection 216c therefore scatters a force to be imparted from the magnet 218 to the rotor 216 when the magnet 218 is pressed fitted into the projection 216c. This is also successful to release the internal stress.

The rotor 216 with the mirror surfaces 216b makes it needless to affix mirror chips, films or similar members to the sides of a rotor and thereby reduces the number of parts. In addition, the rotor 216 does not need highly accurate adhesion and is therefore free from the peeling of mirror surfaces ascribable to a centrifugal force.

The polygonal mirror is miniature because the mirror surfaces 216b are formed by machining the side of the rotor 216. The mirror therefore needs a minimum of exclusive space when mounted on a laser printer or similar image forming apparatus, thereby miniaturizing the entire apparatus.

Because the rotor 216 with the mirror surfaces 216b is formed of aluminum, the entire rotor portion 211 is lightweight. This is desirable in the aspect of oscillation and noise.

The annular projection 216c is formed on the bottom of the rotor 216 and allows the magnet 218 to be easily positioned concentrically with the shaft 217. In addition, the magnet 218 and shaft 217 are free from eccentricity. Eccentricity would disturb the dynamic balance and would thereby degrade the jitter characteristic while aggravating oscillation and noise.

Further, the annular projection 216c formed on the bottom of the rotor 216 facilitates the press fitting of the magnet 218 and accurately positions the magnet in the radial direction of the polygonal mirror. The magnet 218 is therefore prevented from coming off or being dislocated by a centrifugal force.

The illustrative embodiment with the above mirror surfaces 216b and magnet 218 free from peeling or dislocation achieves high durability. Further, the illustrative embodiment is extremely easy to produce and high quality because the mirror surfaces 216b do not need accurate adhesion and because the magnet 218 is easy to position.

The magnet 218 is press fitted in the rotor 216 having the mirror surfaces 216b. It is therefore likely that the resulting internal stress is imparted to the mirror surfaces 216b or that an internal stress ascribable to a centrifugal force is imparted to the mirror surfaces 216b. The illustrative embodiment solves this problem with the annular projection 216c of the rotor 216 offset relative to the mirror surfaces both in the radial and axial directions of the polygonal mirror. Because the mirror surfaces 216b are free from deformation ascribable to the internal stress derived from press fitting, the magnet 218 can be press fitted in the projection 216c after the finishing of the rotor 216.

To prevent the internal stress ascribable to press fitting from reaching the mirror surfaces 216b, the magnet 218 is press fitted in the annular thin portion 21 6c first. Subsequently, the rotor 216 may be annealed for removing hysteresis and then finished. This, however, needs an annealing step.

Figure 34A:
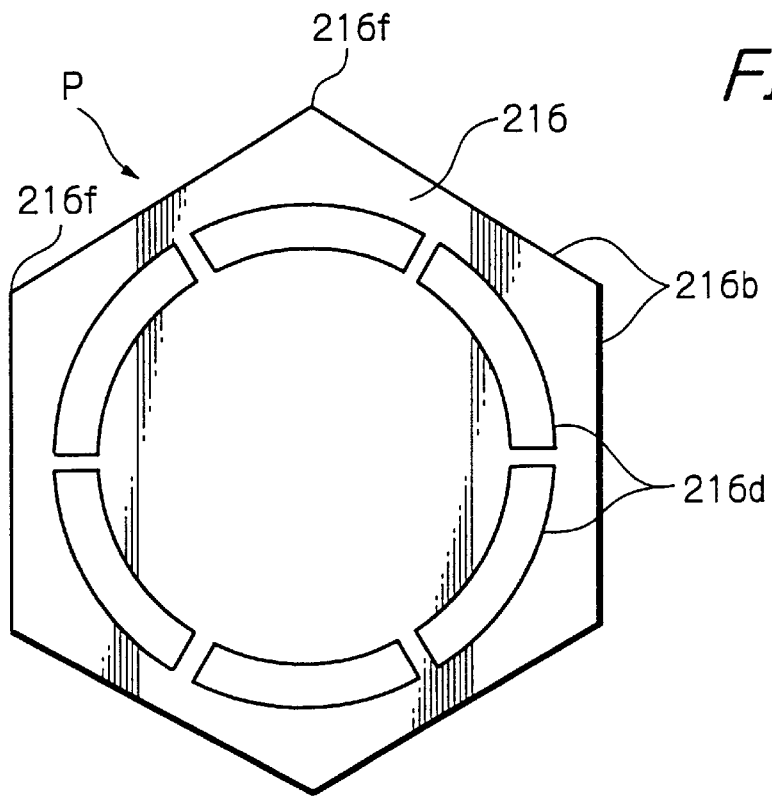
FIGS. 34A and 34B are bottom views each showing a particular modification of the thirteenth embodiment.
Figure 34B:
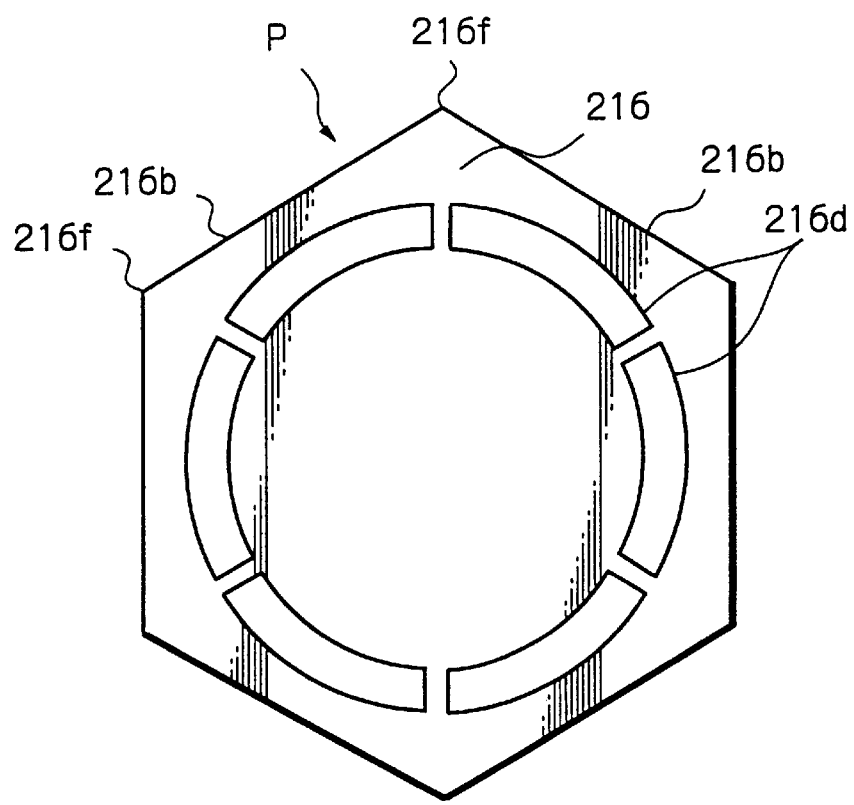

FIGS. 34A and 34B each show a specific modification of the annular projection 216c included in the polygonal mirror P. In FIG. 34A, the projection 216c is divided into six arcuate portions 216d identical in configuration in the circumferential direction. The centers of the six arcuate portions 216d each correspond to one apex 216f of the mirror P. If desired, the six portions 216d may each be bisected to form twelve portions in total. That is, when the regular polygon has nsides, the projection 216c should preferably be divided by a×n (n being a natural number) from the dynamic balance standpoint. The configuration shown in FIG. 34A promotes the deformation of the projections 216d at the time of press fitting of the magnet 218. In addition, the polygonal mirror P can be formed of a sparingly deformable material.

As shown in FIG. 34B, the arcuate portions 216d may be positioned such that portions between the nearby arcuate portions 216d correspond to the apexes of the mirror P.

Figure 35:
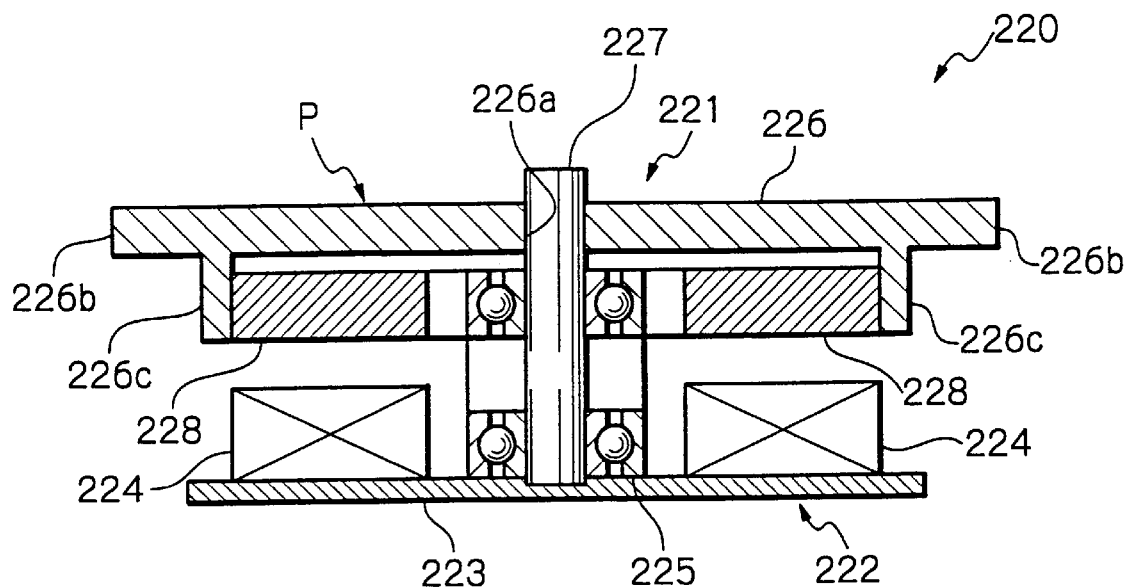
FIGS. 35, 36, 37 and 38 are sectional side elevations respectively showing a fourteenth, a fifteenth, a sixteenth and a seventeenth embodiment of the present invention.

FIG. 35 shows a fourteenth embodiment of the present invention. As shown, a polygonal mirror type scanner, generally 220, includes a brushless DC motor made up of a stator portion 222 and a rotor portion 221. The stator portion 222 has a stator yoke 223, a coil 224 affixed to the top of the stator yoke 223, and a bearing 225 positioned at the center of the stator yoke 223.

The rotor portion 221 includes a rotor 226 formed with a center hole 226a in which a shaft 227 is press fitted. The rotor 226 has its circumference ground and polished in a regular polygonal configuration, as seen in a plan view, so as to form mirror surfaces (square pillar sides) 226b. An annular projection 226c is formed on the bottom or one major surface of the rotor 226 for press fitting a multipolar magnet 282 along the inner circumference thereof. The rotor portion 221 is rotatably supported by the bearing 225 of the stator portion 222 via the shaft 227. The multipolar magnet 228 and coil 224 face each other, constituting a brushless DC motor.

The regular polygonal rotor 226 is formed of aluminum. In the illustrative embodiment, the rotor 226 has a regular hexagonal contour in a plan view, i.e., it has an upper and a lower major surface both of which are regular hexagonal. The circumference of the rotor 226 is machined to form the mirror surfaces 226b forming the contour of the rotor 226, thereby constituting a polygonal mirror P. The shaft 227 is press fitted in the center hole 226a of the rotor 226 in the direction perpendicular to the rotor 226. Again, the rotor 226 may be provided with any suitable regular polygonal contour other than the regular hexagonal contour.

The annular projection 226c formed on the bottom of the rotor 226 is concentric with the center hole 226a and shaft 227. The magnet 228 is press fitted along the inner circumference of the projection 226c.

The above projection 226c is offset relative to the mirror surfaces 226b in both of the radial and axial directions of the polygonal mirror P. That is, the projection 226c is closer to the center than the mirror surfaces 226b by a preselected distance in the radial direction and does not face the mirror surfaces 226b in the axial direction.

The scanner 220 having the above construction achieves the same advantages as the scanner shown in FIG. 5.

Figure 36:
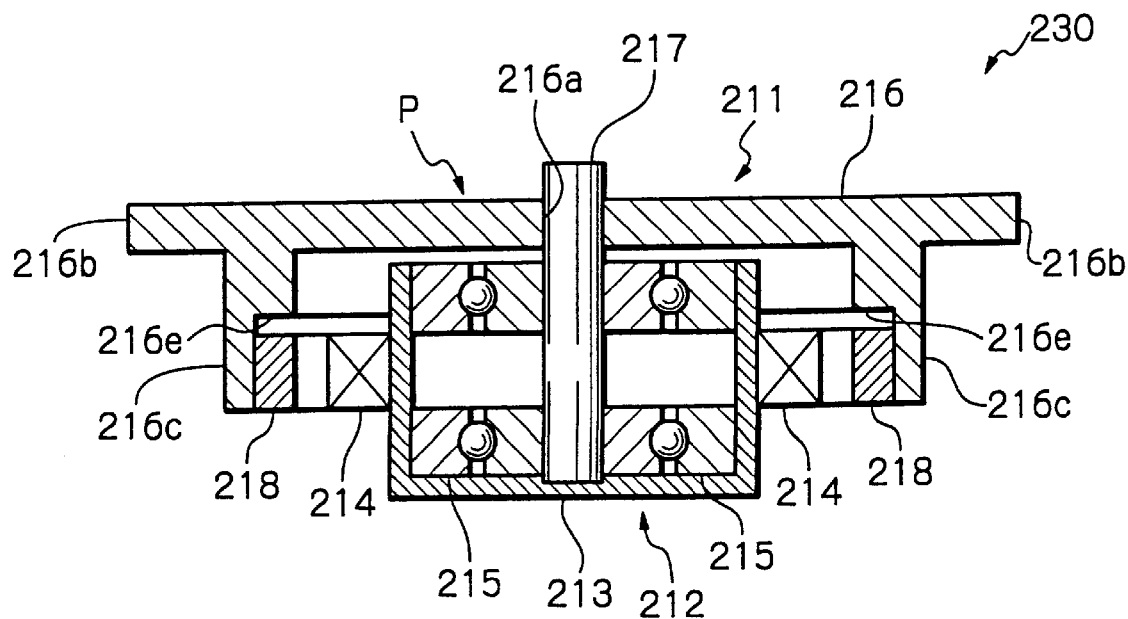

FIG. 36 shows a fifteenth embodiment of the present invention. This embodiment is identical with the thirteenth embodiment of FIG. 32 except for the following. As shown, a polygonal mirror type scanner, generally 210, includes the annular projection 216c. The inner circumference of the projection 216c is formed with a notch 216e, so that the projection 216c can easily deform when the magnet 218 is press fitted.

Figure 37:
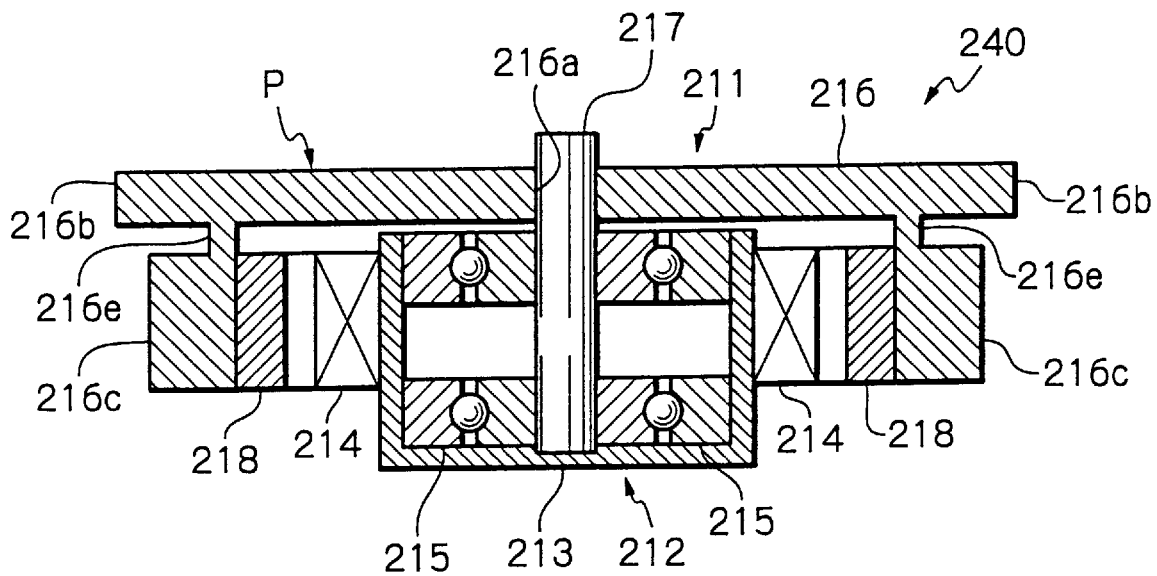

FIG. 37 shows a sixteenth embodiment of the present invention. This embodiment is also identical with the thirteenth embodiment of FIG. 32 except for the following. As shown, a polygonal mirror type scanner, generally 240, includes the annular projection 216c. The outer circumference of the projection 216c is formed with a notch 216e, so that the projection 216c can easily deform when the magnet 218 is press fitted.

Figure 38:
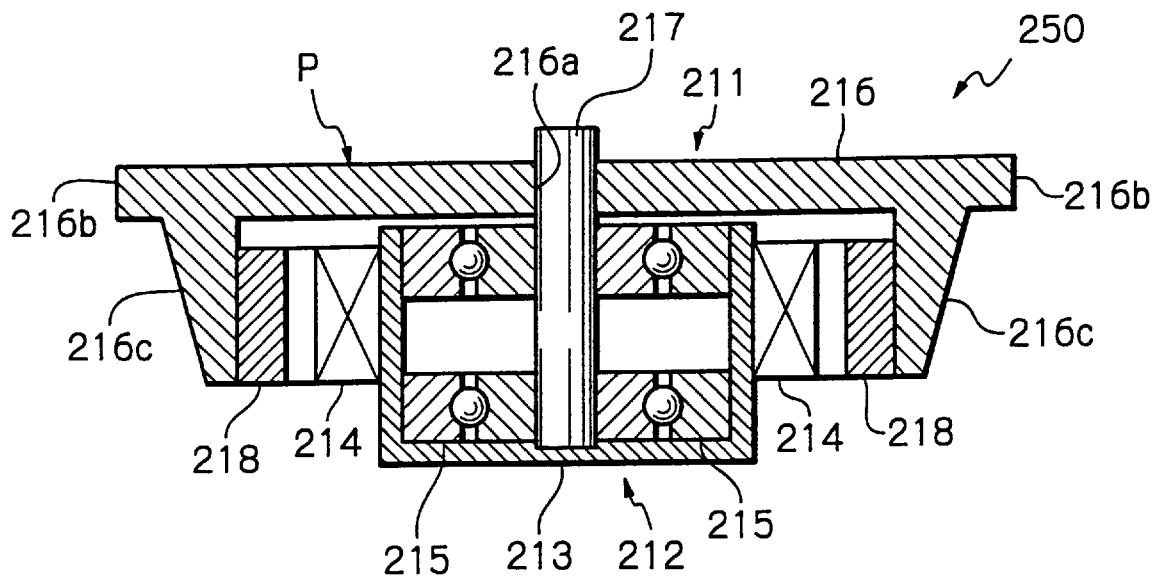

FIG. 38 shows a seventeenth embodiment of the present invention. This embodiment is also identical with the thirteenth embodiment of FIG. 32 except for the following. As shown, a polygonal mirror type scanner, generally 250, includes the annular projection 216c. The outer circumference of the projection 216c is tapered, so that the projection 216c can easily deform when the magnet 218 is press fitted.

The embodiments shown in FIGS. 36–38 may, of course, be applied to the brushless motor of the type described in relation to the fourteenth embodiment.

Figure 39A:
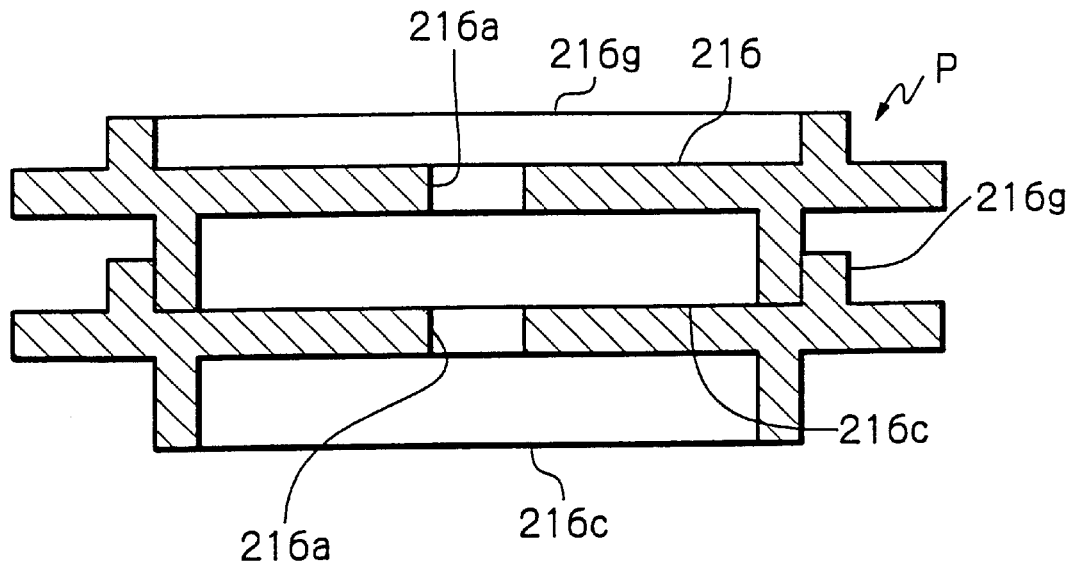
FIG. 39A is a sectional view showing a stack of blank pieces expected to form a modification of the polygonal mirror.

A specific procedure for forming the mirror surfaces 216b on the polygonal mirror P shown in FIG. 32 will be described with reference to FIGS. 39A and 39B. As shown in FIG. 39A, blank pieces p expected to form the polygonal mirrors P are stacked one upon the other. Each blank piece p includes the annular projection 216c protruding downward from the rotor 216 for press fitting the multipolar magnet 218, not shown, and an annular projection 216g protruding upward from the rotor 216. The inner circumference of the projection 216g of each blank piece p adjoins the outer circumference of the projection 216c of the overlying blank piece p.

Each projection 216g has an axial length smaller than the axial length of each projection 216c. In this configuration, the nearby blank pieces p are positioned in the axial and radial directions with the inner circumference of the projection 216g and the outer circumference of the projection 216c contacting each other and with the top of the underlying piece p and the bottom of the projection 216c of the overlying piece p contacting each other.

Figure 39B:
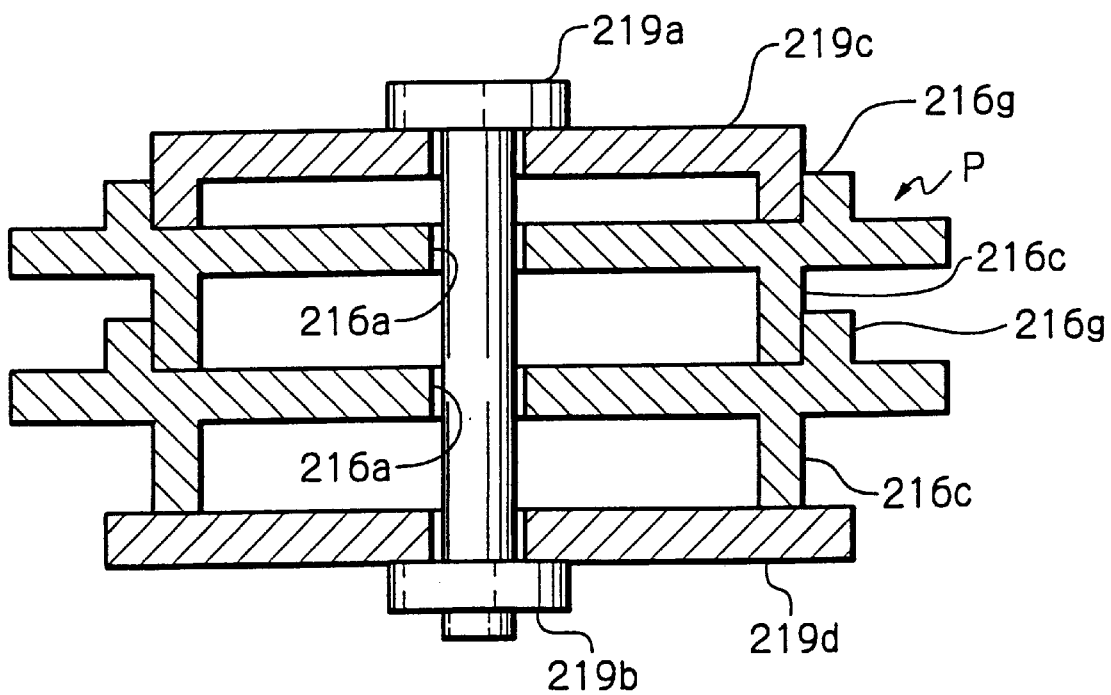
FIG. 39B is a sectional view showing the stack of FIG. 39A in a fastened condition.

As shown in FIG. 39B, the blank pieces p stacked together are held between a flat first jig 219b and a second jig 219d. The first jig 219c has its end adjoining the inner circumference of the projection 216g of top blank piece p. The second jig 219d contacts the lower end of the projection 216c of the bottom blank piece p. A bolt-like fastening member 219a is inserted in the center holes of the two jigs 219c and 219d and the center holes 216a of the blank pieces p. Subsequently, a nut-like fastening member 219b is fitted on the fastening member 219a to thereby fasten the above stack. In this condition, the circumferences of the blank pieces p can be machined together to form the mirror surfaces 216b. This successfully reduces the number of machining steps and thereby promotes efficient machining. Further, the fastening means 219a and 219b exert a fastening force on the blank pieces p linearly in parallel to the axis of the stack, freeing the resulting polygonal mirrors from deformation. Moreover, in the illustrative embodiment, the projections 216g do not contact or scratch the inner circumferences of the associated projections 216c. The magnet 218 can therefore be smoothly press fitted in the projection 216c.

While the above procedure has concentrated on a stack of two blank pieces p, three or more blank pieces may, of course, be stacked together.

Figure 40A:
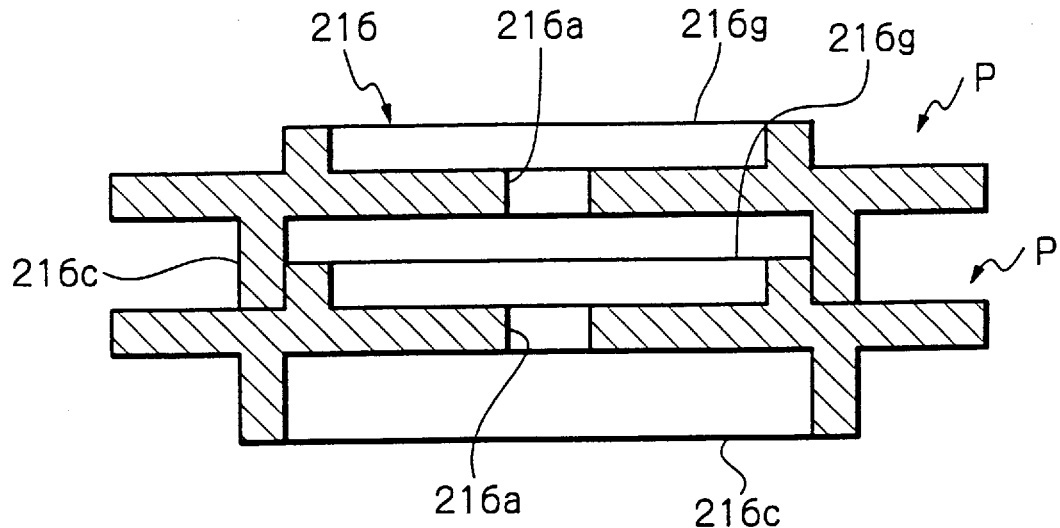
FIG. 40A is a sectional view showing a stack of blank pieces expected to form another modification of the polygonal mirror.

A specific procedure for machining another modified form of the polygonal mirror will be described with reference to FIGS. 40A and 40B. As shown in FIG. 40A, blank pieces p expected to form the polygonal mirrors P are stacked one upon the other. Each blank piece p includes the annular projection 216c protruding downward from the rotor 216 for press fitting the multipolar magnet 218, not shown, and annular projection 216g protruding upward from the rotor 216. The outer circumference of the projection 216g of each blank piece p adjoins the inner circumference of the projection 216c of the overlying blank piece p.

Each projection 216g has an axial length smaller than the axial length of each projection 216c. In this configuration, the nearby blank pieces p are positioned in the axial and radial directions with the outer circumference of the projection 216g and the inner circumference of the projection 216c contacting each other and with the top of the underlying piece p and the bottom of the projection 216c of the overlying piece p contacting each other.

Figure 40B:
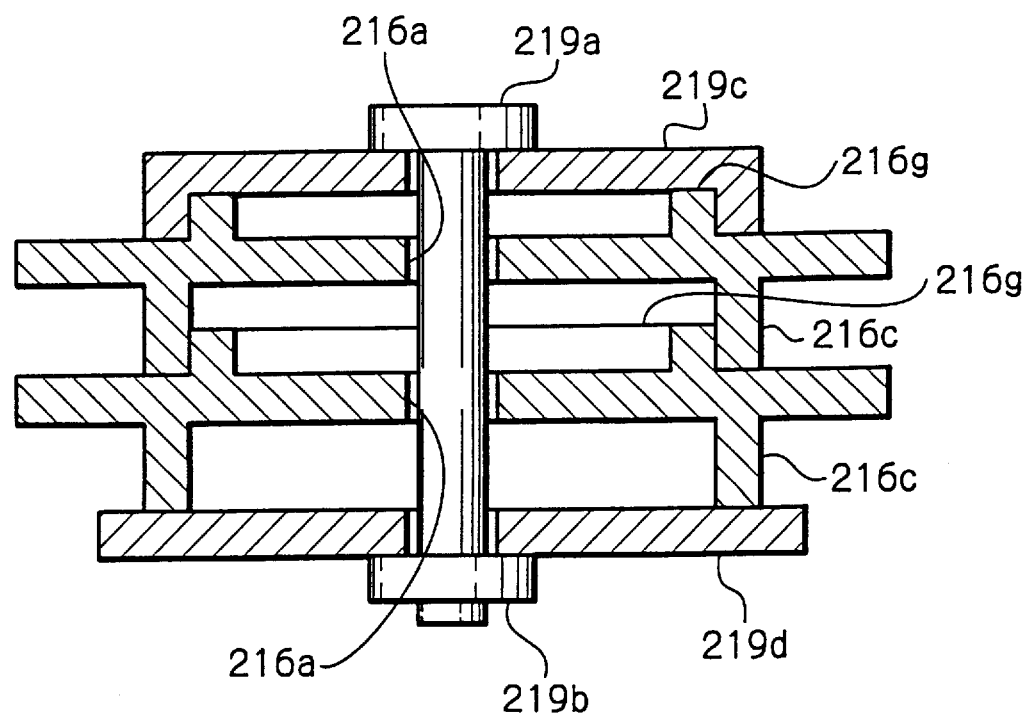
FIG. 40B is a sectional view showing the stack of FIG. 40A in a fastened condition.

As shown in FIG. 40B, the blank pieces p stacked together are held between the first jig 219c and the second jig 219d. The first jig 219c has its end adjoining the outer circumference of the projection 216g of top blank piece p. The second jig 219d contacts the lower end of the projection 216c of the bottom blank piece p. The bolt-like fastening member 219a is inserted in the center holes of the two jigs 219c and 219d and the center holes 216a of the blank pieces p. Subsequently, the nut-like fastening member 219b is fitted on the fastening member 219a to thereby fasten the above stack. In this condition, the circumferences of the blank pieces p can be machined together to form the mirror surfaces 216b. This successfully reduces the number of machining steps and thereby promotes efficient machining. In addition, the fastening means 219a and 219b exert a fastening force on the blank pieces p linearly in parallel to the axis of the stack, freeing the resulting polygonal mirrors from deformation.

If desired, each projection 216g may be provided with a greater axial length than the projection 216c. In such a configuration, the outer circumference of the projection 216g and the inner circumference of the projection 216c will contact each other, and the bottom of the rotor 216 and the top of the projection 216c will contact each other. This is also successful to position the blank pieces p in the axial and radial directions.

Figure 41A:
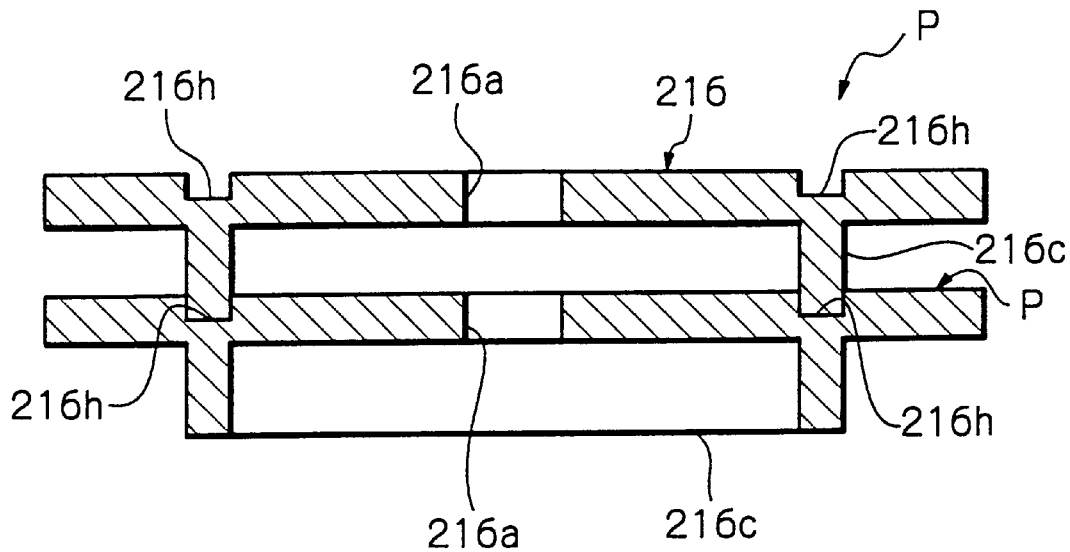
FIG. 41A is a sectional view showing a stack of blank pieces expected to form still another modification of the polygonal mirror.

A specific procedure for machining another modified form of the polygonal mirror will be described with reference to FIGS. 41A and 41B. As shown in FIG. 41A, blank pieces p expected to form the polygonal mirrors P are stacked one upon the other. Each blank piece p includes the annular projection 216c protruding downward from the rotor 216 for press fitting the multipolar magnet 218, not shown, and an annular recess 216h formed in the top of the rotor 216. The recess 216h is engaged with the projection 216c of the overlying blank piece p. Each recess 216h has a depth smaller than the axial length of each projection 216c. In this configuration, the rotors 216 of the blank pieces p are positioned in the axial and radial directions without contacting each other, but with the inner periphery of each recess 216h contacting the lower portion of the associated projection 216c. Because the rotors 216 do not contact each other, they are free from scratches during machining.

Figure 41B:
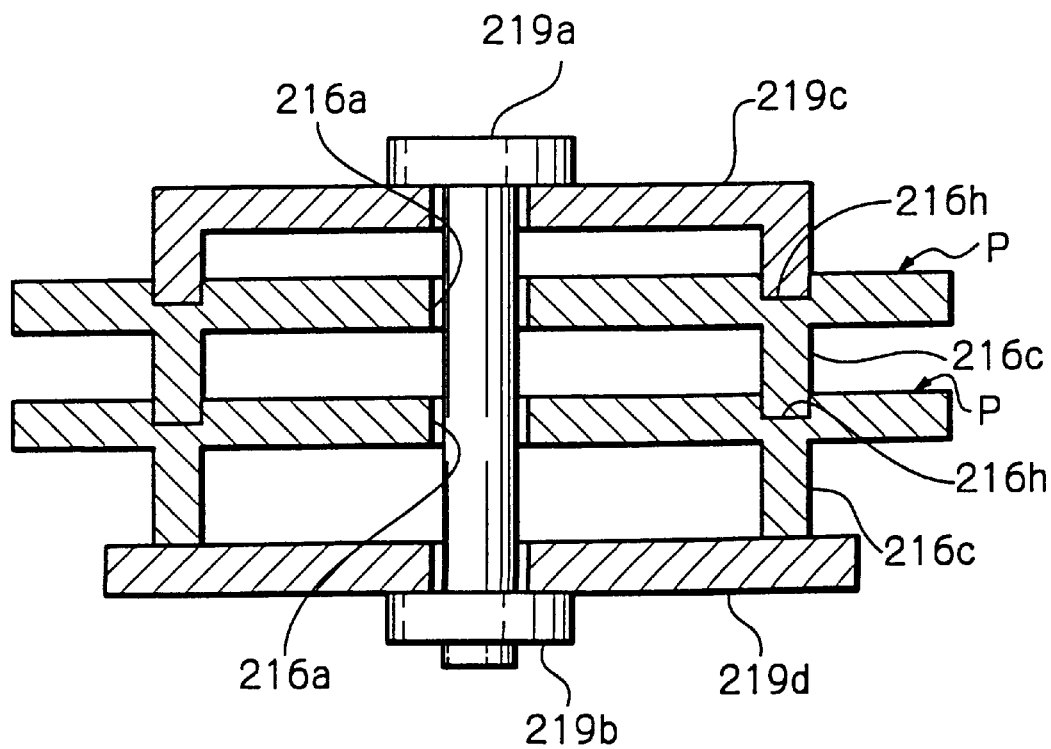
FIG. 41B is a sectional view showing the stack of FIG. 41A in a fastened condition.

As shown in FIG. 41B, the blank pieces p stacked together are held between the flat first jig 219c and second jig 219d. The first jig 219c has its end received in the recess 216h of the top blank piece p. The second jig 219d contacts the lower end of the projection 216c of the bottom blank piece p. The bolt-like fastening member 219a is inserted in the center holes of the two jigs 219c and 219d and the center holes 216a of the blank pieces p. Subsequently, the nut-like fastening member 219b is fitted on the fastening member 219a to thereby fasten the above stack. In this condition, the circumferences of the blank pieces p can be machined together to form the mirror surfaces 216b. This successfully reduces the number of machining steps and thereby promotes efficient machining. In addition, the fastening means 219a and 219b exert a fastening force on the blank pieces p linearly in parallel to the axis of the stack, freeing the resulting polygonal mirrors from deformation.

Figure 42:
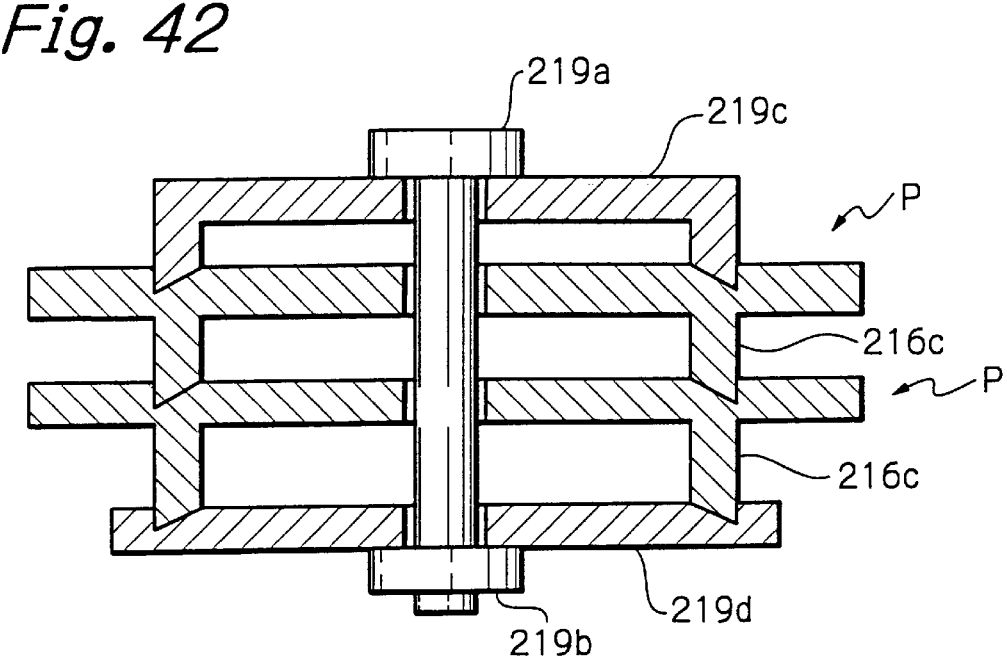
FIG. 42 is a sectional view showing a stack of blank pieces expected to form a further modification of the polygonal mirror.
Figure 43:
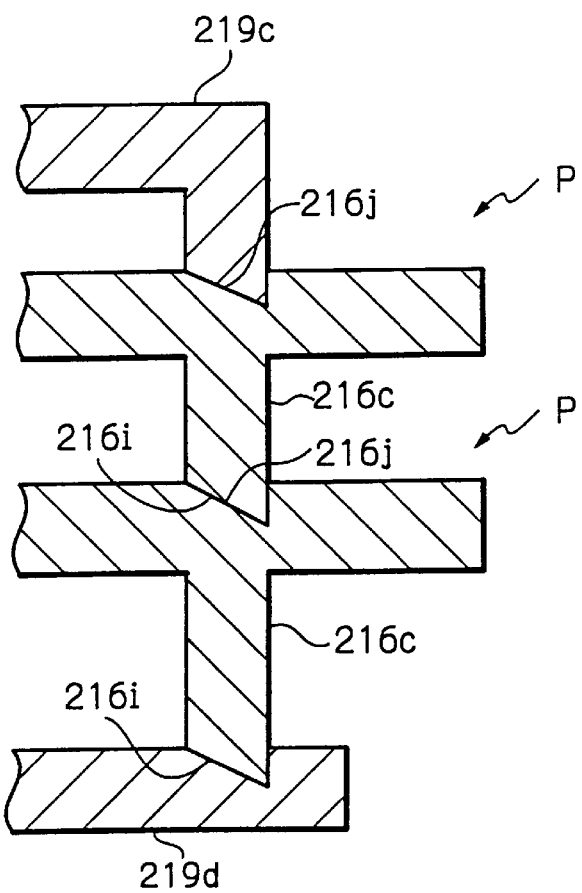
FIG. 43 is an enlarged sectional view of the stack shown in FIG. 42.

FIGS. 42 and 43 show a procedure for machining another modified form of the polygonal mirror. As shown, the bottom of the projection 216c of each blank piece p is inclined toward the center, i.e., implemented as an annular tapered surface 216i whose inside diameter sequentially increases toward the bottom. The bottom of the annular recess is implemented as a tapered surface 216j tapered complementarily to the tapered surface 216i, as illustrated. In this configuration, the internal stress ascribable to the fastening force and imparted from the projection 216c to the recess is directed toward the center, so that the mirror surfaces are free from deformation. Further, the inclined surface 216i serves to guide the magnet being inserted into the projection 216c. In addition, the inclined surface 216i facilitates the removal of the blank piece p from the underlying blank piece p. If desired, a gap may be formed between the outer circumference of the projection 216c and that of the recess in order to obviate the internal stress more positively.

In summary, it will be seen that the present invention provides a rotary body including a minimum number of parts, not needing highly accurate adhesion, having high durability, easy to produce, and free from deformation apt to occur on its side. Further, a rotary polygonal mirror whose mirror surfaces are free from deformation is achievable.

Various modifications will become possible for those skilled in the art after receiving the teachings of the present disclosure without departing from the scope thereof.

What is claimed is:

1. A rotary body formed with a plurality of surfaces on a side thereof, comprising:
   an element for causing said rotary body to rotate; and
   mounting means for mounting said element to said rotary body by press fitting while preventing a stress ascribable to the press fitting from being transferred to said side;
   said mounting means being formed integrally with a first major surface of said rotary body perpendicular to said side.

2. A rotary body as claimed in claim 1, wherein said mounting means has a substantially annular thin configuration positioned closer to a rotary shaft of said rotary body than said side coaxially with said rotary shaft.

3. A rotary body as claimed in claim 2, wherein said element is positioned inside of said mounting means, an outer circumference of said mounting means being inclined toward an axis of said rotary shaft from a boarder between said outer circumference and said first major surface.

4. A rotary body as claimed in claim 2, wherein said element is positioned inside of said mounting means, said first major surface and an end of said element facing said first major surface being spaced from each other.

5. A rotary body as claimed in claim 2, wherein said element is positioned inside of said mounting means such that said mounting means is displaced by a rotation of said rotary body at a boarder between said mounting means and said first major surface.

6. A rotary body as claimed in claim 1, wherein said mounting means comprises a projection coaxial with a rotary shaft of said rotary body, said rotary body further comprising engaging means formed in a second major surface facing said first major surface at an opposite side of said side for receiving said mounting means.

7. A rotary body as claimed in claim 6, wherein said mounting means has a substantially annular thin configuration positioned closer to a rotary shaft of said rotary body than said side coaxially with said rotary shaft.

8. A rotary body as claimed in claim 7, wherein said element is positioned inside of said mounting means, an outer circumference of said mounting means being inclined toward an axis of said rotary shaft from a boarder between said outer circumference and said first major surface.

9. A rotary body as claimed in claim 7, wherein said element is positioned inside of said mounting means, said first major surface and an end of said element facing said first major surface being spaced from each other.

10. A rotary body as claimed in claim 7, wherein said element is positioned inside of said mounting means such that said mounting means is displaced by a rotation of said rotary body at a boarder between said mounting means and said first major surface.

11. A rotary body as claimed in claim 7, wherein a recess extending toward said second major surface is formed in a center of said first major surface and formed with a through hole for receiving said rotary shaft.

12. A rotary polygonal mirror comprising:
    a mirror forming portion including a side formed with a plurality of mirror surfaces at equally spaced locations in a circumferential direction, a first major surface perpendicular to said side, and a second major surface perpendicular to said side and facing said first major surface at an opposite side of said side; and
    an annular thin portion formed integrally with said first major surface, said annular thin portion having a substantially cylindrical configuration coaxial with a rotary shaft of said rotary polygonal mirror and an outer circumference positioned closer to said rotary shaft than said side;
    said annular thin portion being displaced by a force ascribable to press fitting of a magnet at a boarder between said first major surface and said annular thin portion.

13. A polygonal mirror as claimed in claim 12, further comprising an engaging portion formed in said second major surface and complementary in shape to an end of said annular thin portion.

14. A polygonal mirror as claimed in claim 13, wherein said engaging portion comprises a recess.

15. A polygonal mirror as claimed in claim 12, further comprising a projection protruding from said second major surface and contacting at least one of the outer circumference and the inner circumference of said annular thin portion, said projection being complementary in shape to said outer circumference or said inner circumference.

16. A polygonal mirror as claimed in claim 12, wherein the outer circumference of said annular thin portion is inclined toward an axis of said rotary shaft toward an end of said annular thin portion.

17. A polygonal mirror as claimed in claim 12, further comprising a gap spacing said first major surface and an end of a magnet press fitted in the inner circumference of said annular thin portion facing said first major surface.

18. A rotary unit comprising:

a rotary polygonal mirror including a mirror forming portion having a side formed with a plurality of mirror surfaces at equally spaced locations in a circumferential direction, a first major surface perpendicular to said side, and a second major surface perpendicular to said side and facing said first major surface at an opposite side of said side;

a magnet mounted on said polygonal mirror;

a body facing said magnet and including a yoke;

a rotary shaft affixed to either one of said body and said rotary polygonal mirror, said magnet and said yoke cooperating to cause said rotary polygonal mirror to rotate about said rotary shaft; and an annular thin portion formed integrally with said first major surface, said annular thin portion including a substantially cylindrical inner circumference coaxial with said rotary shaft and an outer circumference positioned closer to said rotary shaft than said side;

said annular thin portion being displaced by a force ascribable to press fitting of a magnet at a boarder between said first major surface and said annular thin portion.

* * * * *

UNITED STATES PATENT AND TRADEMARK OFFICE
CERTIFICATE OF CORRECTION

PATENT NO. : 6,175,439

DATED : January 16, 2001

INVENTOR(S): Shinichi OZAKI, et al.

It is certified that an error appears in the above-identified patent and that said Letters Patent is hereby corrected as shown below:

On the title page, Item (73), the Assignee's name is listed incorrectly. Item (73) should read as follows:

(73) Assignee: Ricoh Company, Ltd., Tokyo (JP)

Signed and Sealed this

Fifteenth Day of May, 2001

*Attest:*

NICHOLAS P. GODICI

*Attesting Officer*  *Acting Director of the United States Patent and Trademark Office*